US012558767B2

(12) United States Patent
Kawakami et al.

(10) Patent No.: US 12,558,767 B2
(45) Date of Patent: Feb. 24, 2026

(54) POWER TOOL

(71) Applicant: MAKITA CORPORATION, Anjo (JP)

(72) Inventors: Takahiro Kawakami, Anjo (JP); Satoshi Ninagawa, Anjo (JP); Ryosuke Otani, Anjo (JP); Shinichi Honma, Anjo (JP)

(73) Assignee: MAKITA CORPORATION, Anjo (JP)

( * ) Notice: Subject to any disclaimer, the term of this patent is extended or adjusted under 35 U.S.C. 154(b) by 83 days.

(21) Appl. No.: 18/516,401

(22) Filed: Nov. 21, 2023

(65) Prior Publication Data

US 2024/0173839 A1 May 30, 2024

(30) Foreign Application Priority Data

| | | |
|---|---|---|
| Nov. 24, 2022 | (JP) | 2022-187781 |
| Nov. 24, 2022 | (JP) | 2022-187782 |
| Nov. 24, 2022 | (JP) | 2022-187783 |
| Nov. 24, 2022 | (JP) | 2022-187784 |

(51) Int. Cl.

| | |
|---|---|
| ***B25F 5/00*** | (2006.01) |
| ***B24B 23/02*** | (2006.01) |
| ***B24B 47/12*** | (2006.01) |

(52) U.S. Cl.

CPC .............. *B25F 5/001* (2013.01); *B24B 47/12* (2013.01); *B24B 23/028* (2013.01)

(58) Field of Classification Search

CPC ........... B24B 23/028; B25F 5/02; B25F 5/001

See application file for complete search history.

(56) References Cited

U.S. PATENT DOCUMENTS

| | | | | |
|---|---|---|---|---|
| 2007/0141967 | A1* | 6/2007 | Kobayashi | B25B 21/00 451/359 |
| 2007/0181322 | A1* | 8/2007 | Hansson | B25F 5/001 173/217 |
| 2012/0282846 | A1 | 11/2012 | Kuether et al. | |
| 2024/0253203 | A1* | 8/2024 | Tamura | B25F 5/001 |

FOREIGN PATENT DOCUMENTS

| | | |
|---|---|---|
| EP | 2 189 244 A2 | 5/2010 |
| EP | 2 467 235 B1 | 12/2013 |

* cited by examiner

*Primary Examiner* — Daniel Jeremy Leeds

(74) *Attorney, Agent, or Firm* — Oliff PLC

(57) ABSTRACT

A power tool has a motor, an output shaft, a spindle, a gear, a gear housing and a bearing. The spindle is configured to be rotated around a drive axis crossing an extending direction of the output shaft. The gear is fitted on the spindle and configured to transmit rotation of the output shaft to the spindle. The gear housing houses the spindle, the gear and the bearing with the lower end part of the spindle protruded downward. The bearing is arranged on the radially outer side of the gear and configured to support the spindle so as to be rotatable around the drive axis.

18 Claims, 21 Drawing Sheets

POWER TOOL

CROSS-REFERENCE TO RELATED APPLICATIONS

The present application claims priority to Japanese patent application Nos. 2022-187781 filed on Nov. 24, 2022, 2022-187782 filed on Nov. 24, 2022, 2022-187783 filed on Nov. 24, 2022, and 2022-187784 filed on Nov. 24, 2022. The contents of the foregoing applications are hereby fully incorporated herein by reference.

TECHNICAL FIELD

The present disclosure relates to a power tool that is configured to rotationally drive a tool accessory.

BACKGROUND

Power tools that are configured to perform an operation on a workpiece by rotationally driving a tool accessory mounted to a spindle are known. European Patent No. 2467235 discloses a grinder that has a ring gear having a recess open to the tool accessory side and a bearing device a part of which is arranged within the recess.

SUMMARY

In the grinder of EP2467235, the height of a gear housing is reduced by arranging part of the bearing device within the recess of the ring gear. Not only in a grinder but in the field of power tool, however, a room for improvement is left in the technique for reducing the height of a gear housing. It is accordingly a non-limiting object of the present disclosure to provide a technique for reducing the height of a gear housing in a power tool that is configured to rotationally drive a tool accessory.

According to an aspect of the present disclosure, a power tool is provided. The power tool has a motor, an output shaft, a spindle, a gear, a gear housing and a bearing. The output shaft is configured to be rotated around an output axis by the motor. The spindle is configured to be rotated around a drive axis. The drive axis crosses an extending direction of the output shaft and defines an up-down direction of the power tool. The spindle has a lower end part that is configured such that a tool accessory is removably mounted thereto. The gear is fitted on (provided around) the spindle and configured to transmit rotation of the output shaft to the spindle. The gear housing is configured to house the spindle, the gear and the bearing with the lower end part of the spindle protruded downward. The bearing is arranged on a radially outer side of the gear and configured to support the spindle so as to be rotatable around the drive axis.

According to this aspect, the bearing is arranged on the radially outer side of the gear, so that the whole length of the spindle can be shortened compared with a structure in which the bearing is fitted onto the spindle. Thus, the gear housing can be reduced in height in the up-down direction.

The "power tool" includes a drilling or fastening tool, a cutting tool and a grinding tool that perform drilling or fastening operation, cutting operation and grinding operation, respectively, on a workpiece by rotationally driving a tool accessory mounted to a spindle. Such a rotary tool includes a grinder, a driver drill, an oscillating drill, a hammer drill, a circular saw and a multi-tool.

In the above-described aspect, the arrangement of the bearing on the radially outer side of the gear may mean that an imaginary plane orthogonal to the drive axis and passing through the bearing passes through the gear, or that at least part of the gear is arranged between upper and lower ends of the bearing in the up-down direction, or that the bearing is located just on the radially outer side of the gear.

DETAILED DESCRIPTION OF THE EMBODIMENT

Figure 1:
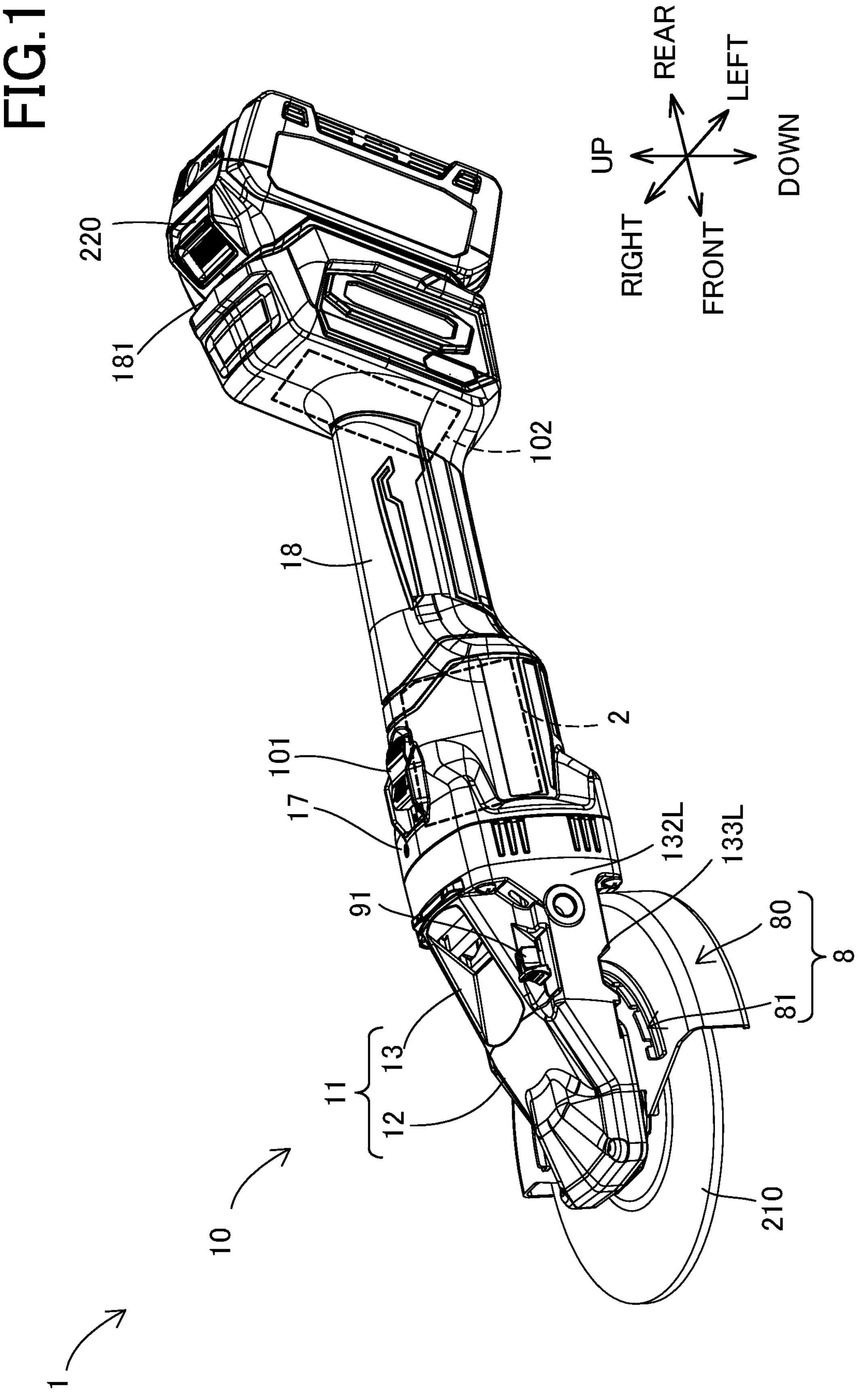
FIG. 1 is an external perspective view of a grinder of a first embodiment of the present disclosure.

In one non-limiting embodiment according to the present disclosure, the outer diameter of the bearing may be larger than the outer diameter of the gear.

According to this embodiment, an outer ring of the bearing can be held, for example, by the gear housing.

In addition or in the alternative to the preceding embodiment, the bearing may be arranged on the radially outer side of the gear, and configured to directly hold the gear. The bearing may be configured to hold the spindle via the gear such that the spindle can rotate around the drive axis.

According to this embodiment, the whole length of the spindle can be shortened compared with a structure in which the bearing is fitted on the spindle. Thus, the gear housing can be reduced in height in the up-down direction.

In addition or in the alternative to the preceding embodiments, the gear housing may have a rib that is configured to hold an outer ring of the bearing.

According to this embodiment, the need for a member for holding an outer ring of the bearing is eliminated. Thus, the number of parts in the gear housing can be reduced and the whole length of the spindle can be shortened.

In addition or in the alternative to the preceding embodiments, the gear may have an opening in a lower surface of the gear and have a recess recessed upward from the opening.

According to this embodiment, a part provided around the spindle can be housed in the recess. Thus, the whole length of the spindle can be further shortened, so that the gear housing can be further reduced in height in the up-down direction.

In addition or in the alternative to the preceding embodiments, the power tool may be a rotary tool that performs an operation on a workpiece by rotationally driving the tool accessory. The lower end part of the spindle may be configured such that the tool accessory is removably mounted thereto by a fastening member being threadedly engaged around the drive axis with the lower end part. The power tool may have an anti-loosening part configured to suppress loosening of the fastening member. At least part of the anti-loosening part may be housed in the recess in the up-down direction.

According to this embodiment, at least part of the anti-loosening part is housed in the recess of the gear, so that the whole length of the spindle can be further shortened, while loosening of the fastening member is suppressed. Thus, the gear housing can be further reduced in height in the up-down direction.

In addition or in the alternative to the preceding embodiments, the power tool may be a rotary tool that performs an operation on a workpiece by rotationally driving the tool accessory. The lower end part of the spindle may be configured such that the tool accessory can be removably mounted thereto by a fastening member being threadedly engaged around the drive axis with the lower end part. The power tool may have an anti-loosening part configured to suppress loosening of the fastening member. The anti-loosening part may be arranged to overlap with the bearing in the up-down direction.

According to this embodiment, the whole length of the spindle can be further shortened, while loosening of the fastening member is suppressed. Thus, the gear housing can be further reduced in height in the up-down direction.

The overlapping of the anti-loosening part with the bearing in the up-down direction means that an imaginary plane orthogonal to the drive axis and passing through the bearing passes through the anti-loosening part, or that at least part of the anti-loosening part is arranged between upper and lower ends of the bearing in the up-down direction, or that the bearing is located just on the radially outer side of the anti-loosening part.

In addition or in the alternative to the preceding embodiments, the spindle may have a spindle flange. The spindle flange may have an outer diameter larger than an inner diameter of the gear. The spindle flange may be arranged on an upper side of the gear.

According to this embodiment, the gear is positioned by the spindle flange. Further, the spindle is held on the gear housing by the bearing via the gear, so that the spindle is restrained from coming off downward from the gear housing.

<The Overall Structure of the Grinder>

A representative, non-limiting embodiment of the present disclosure is now specifically described with reference to FIGS. 1 to 15. In this embodiment, a hand-held disc grinder (hereinafter simply referred to as a grinder 1) is descried as a representative example of a power tool of the present disclosure. The grinder 1 mainly has a housing 10, a motor 2 and a spindle 3.

Figure 3:
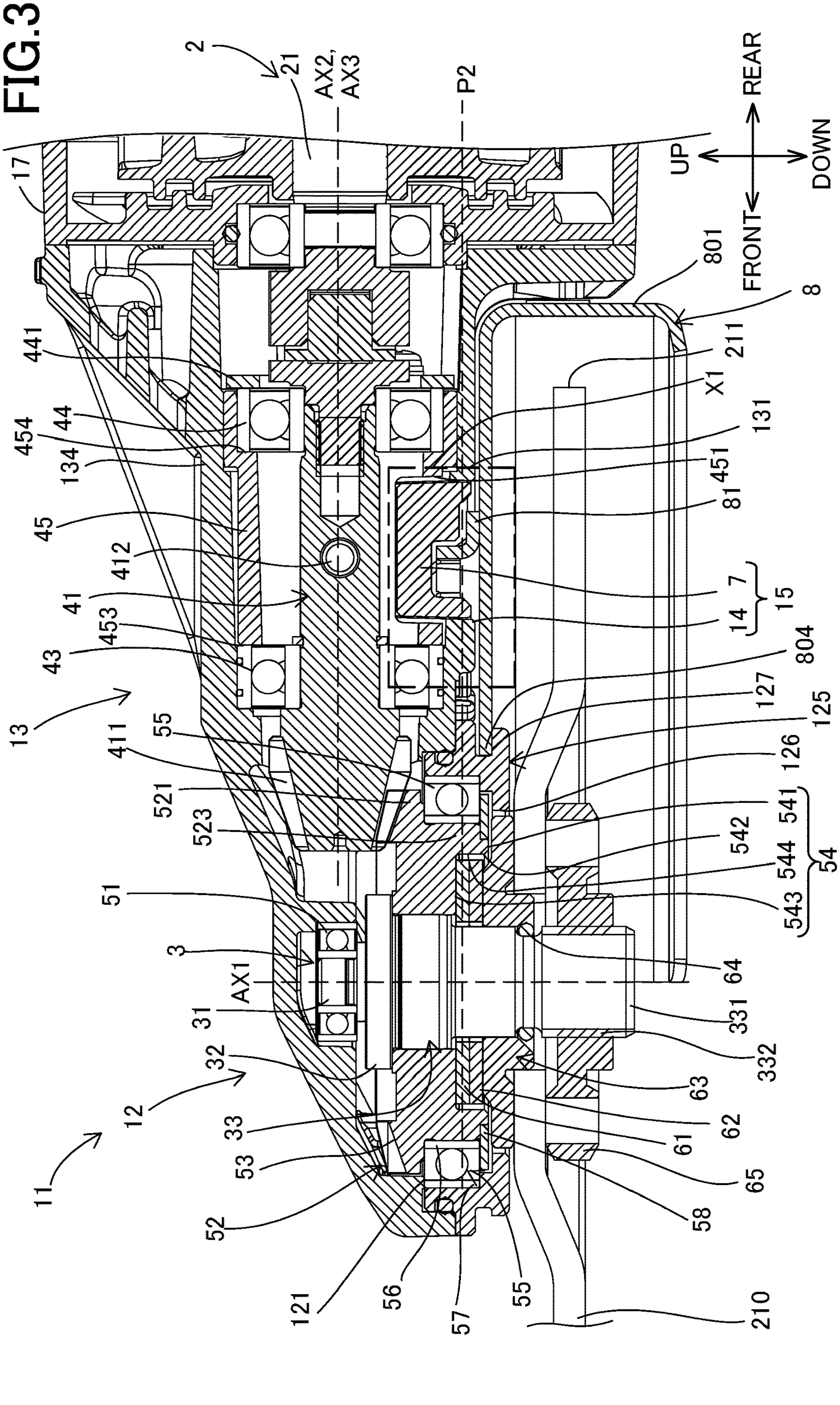
FIG. 3 is a sectional view taken along line III-III in FIG. 2.

The housing 10 defines an outer shell of the grinder 1. As shown in FIG. 1, the housing 10 has an elongate hollow body as a whole. A motor shaft 21 (see FIG. 3) of the motor 2 extends in a longitudinal direction of the housing 10. As shown in FIG. 3, the spindle 3 is arranged along a drive axis AX1 crossing a longitudinal axis of the housing 10. One end part (lower end part 331) of the spindle 3 protrudes from the housing 10 and is exposed to the outside. The lower end part 331 is configured such that a tool accessory 210 can be removably mounted thereto. The spindle 3 is operably connected to the motor 2 to rotate around the drive axis AX1. Thus, the tool accessory 210 mounted to the spindle 3 rotates. The tool accessory 210 that can be mounted to the grinder 1 includes a generally disc-like grinding wheel, a rubber pad, a brush and a blade. A user can perform grinding, polishing, cutting or other similar operation on a workpiece by selecting the tool accessory 210 suitable for a desired operation and mounting it to the grinder 1. The grinder 1 of this embodiment has a cover part 8 that covers part of the tool accessory 210. The cover part 8 is also referred to as a wheel cover, a disc cover or a blade case.

In the following description, for convenience sake, as for the directions of the grinder 1, the extending direction of the drive axis AX1 is defined as an up-down direction. In the up-down direction, the side of the lower end part 331 of the spindle 3 to which the tool accessory 210 is mounted is defined as a lower side, and the opposite side is defined as an upper side. A direction orthogonal to the drive axis AX1 and corresponding to the longitudinal direction of the housing 10 is defined as a front-rear direction. In the front-rear direction, the side of the one end part of the housing 10 in which the spindle 3 is housed is defined as a front side, and the opposite side is defined as a rear side. Further, a direction orthogonal to the front-rear direction and the up-down direction is defined as a left-right direction.

As shown in FIG. 1, the housing 10 includes a gear housing 11, a motor housing 17 and a handle housing 18, which are arranged in this order from the front to the rear.

<Structures of the Motor Housing and Elements Disposed Therein>

Figure 2:
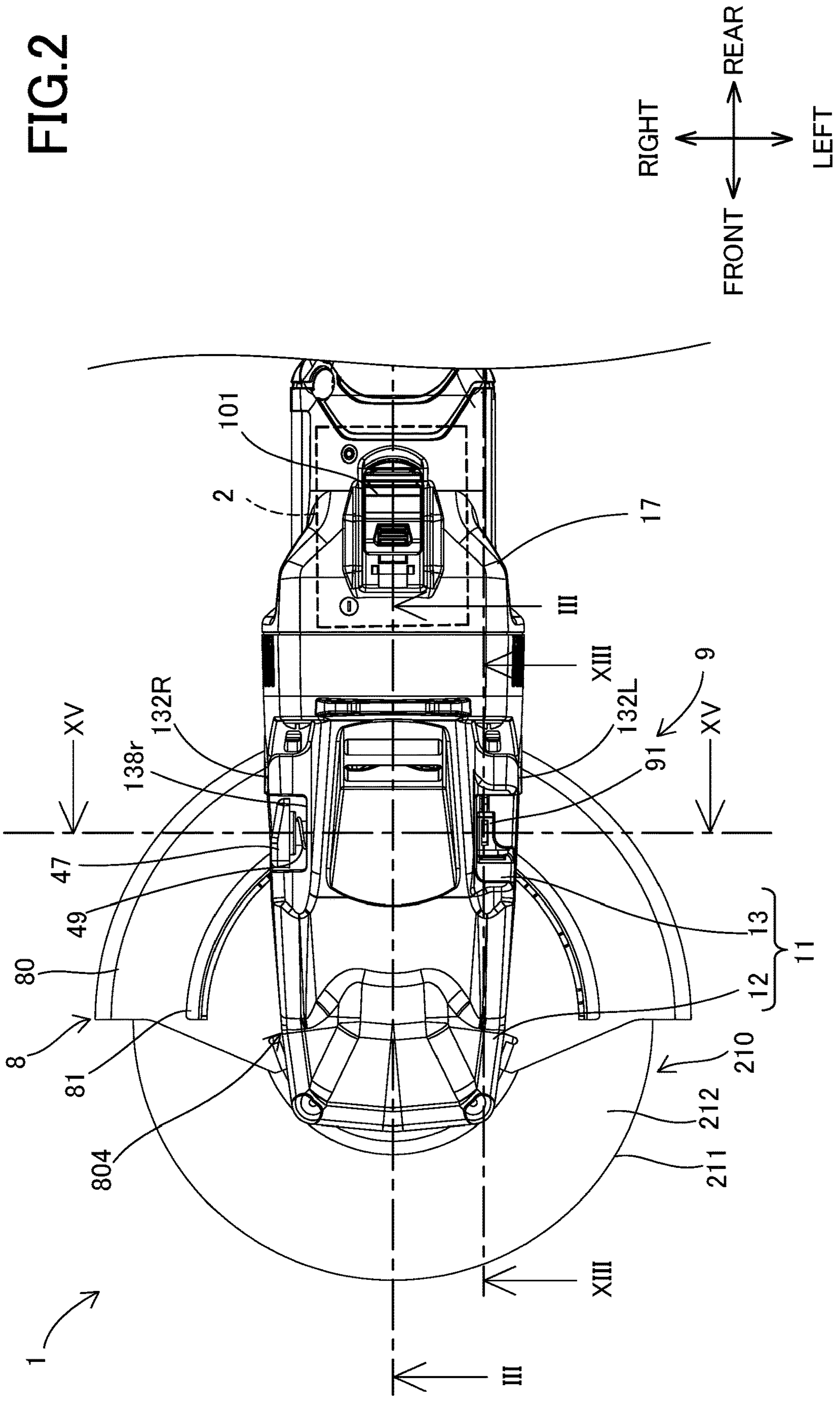
FIG. 2 is a top view of the grinder.

As shown in FIGS. 1 and 2, the motor housing 17 has a generally tubular shape and mainly houses the motor 2. The motor 2 of this embodiment is a brushless motor. The motor 2 has a motor shaft 21 (see FIG. 3). The motor shaft 21 extends in the front-rear direction. Thus, a rotational axis AX2 of the motor 2 extends in the front-rear direction. Front and rear end parts of the motor shaft 21 are rotatably supported by bearings, respectively. A slide switch 101 is arranged on an upper surface of the motor housing 21 and configured to be manually operated by a user. The motor 2 is driven when the switch 101 is turned on by a user.

<Structures of the Handle Housing and Elements Disposed Therein>

As shown in FIG. 1, the handle housing 18 has a generally tubular shape that can be held by a user and extends in the front-rear direction. A battery mounting part 181 is provided in a rear end part of the handle housing 18. The battery mounting part 181 is configured such that a battery 220 for power supply to the motor 2 is removably mounted thereto. A controller 102 is housed in the handle housing 18. The controller 102 is electrically connected to the motor 2 and the switch 101. The controller 102 is configured to control power supply to the motor 2 according to user's manual operation of the switch 101.

<Structures of the Gear Housing and Elements Disposed Therein>

As shown in FIGS. 1 to 3, the gear housing 11 includes a spindle housing part 12 that defines an outer shell of a front end part of the housing 10, and a shaft housing part 13 that extends rearward from the spindle housing part 12 in the front-rear direction.

The shaft housing part 13 is provided in front of the motor housing 17. The shaft housing part 13 mainly houses an output shaft 41, a first bearing 43, a second bearing 44, a spacer 45 and most of an operation lever 9 (see FIG. 13).

As shown in FIG. 3, the output shaft 41 extends coaxially with the motor shaft 21 in front of the motor shaft 21. A rotational axis (output axis) AX3 of the output shaft 41 is coaxial with the rotational axis AX2 of the motor shaft 21. A rear end part of the output shaft 41 is connected to a front end part of the motor shaft 21. The output shaft 41 rotates integrally with the motor shaft 21 around the rotational axis AX3. A small bevel gear 411 is provided on a front end part of the output shaft 41. The grinder 1 of this embodiment is a so-called angle grinder in which the drive axis AX1 is orthogonal to the output axis AX3.

The first and second bearings 43, 44 are fitted onto (provided around) the output shaft 41 and support the output shaft 41 so as to be rotatable around the rotational axis AX3. In this embodiment, the first and second bearings 43, 44 are rolling bearings. The first bearing 43 is arranged on a front part of the output shaft 41. The second bearing 44 is arranged apart from the first bearing 43 on a rear part of the output shaft 41. A bearing retainer 441 is provided on a rear end of the second bearing 44.

The spacer 45 is arranged between the first and second bearings 43, 44. In this embodiment, the spacer 45 has a first abutment part 453 that abuts a rear end of the first bearing 43 and a second abutment part 454 that abuts a front end of the second bearing 454. A rear end part of the spacer 45 covers a radially outer side of the second bearing 454 and abuts the shaft housing part 13.

The shaft housing part 13 has a recess 15 that is formed between the first and second bearings 43, 44 and recessed upward from a lower surface 131 of the shaft housing part 13, which will be described below in detail. The recess 15 is mainly defined by an opening 14 formed in the lower surface 131 and a lower cover 7 for covering the opening 14. A lock plate 81 of a cover part 8 is arranged in the recess 15. The recess 15, the cover part 8 and the lock plate 81 will be described below.

The spindle housing part 12 is now described with reference to FIGS. 3 to 5. The spindle housing part 12 houses the spindle 3 with the lower end part 331 of the spindle 3 exposed therefrom.

Figure 5:
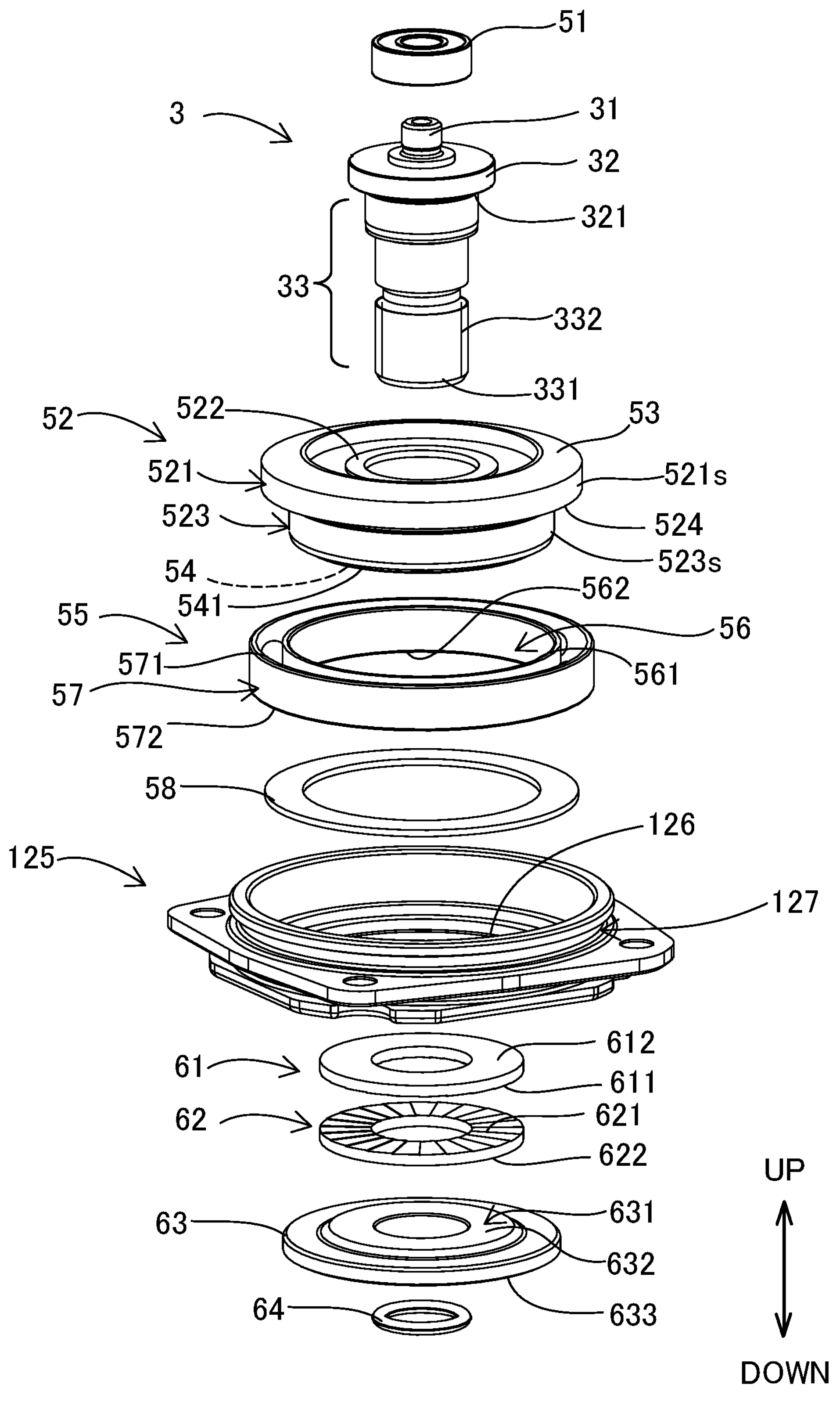
FIG. 5 is an exploded perspective view showing a spindle and parts fitted thereon.

As shown in FIG. 5, the spindle 3 has a first outer diameter part 31, a second outer diameter part 32 and a third outer diameter part 33 in this order from the top to the bottom. The first outer diameter part 31 forms an upper end part of the spindle 3. The second outer diameter part 32 has the largest outer diameter in the spindle 3 and is also referred to as a spindle flange. The third outer diameter part 33 has a smaller outer diameter than the second outer diameter part 32. Thus, the spindle 3 is formed in a multistage shape in which the outer diameter of the second outer diameter part 32 side (upper side) is larger than that of the lower end part 331 side (lower side). The outer diameter of the second outer diameter part 32 is larger than the inner diameter of a gear 52. The outer diameter of the third outer diameter part 33 is smaller than the inner diameter of the gear 52.

Figure 4:
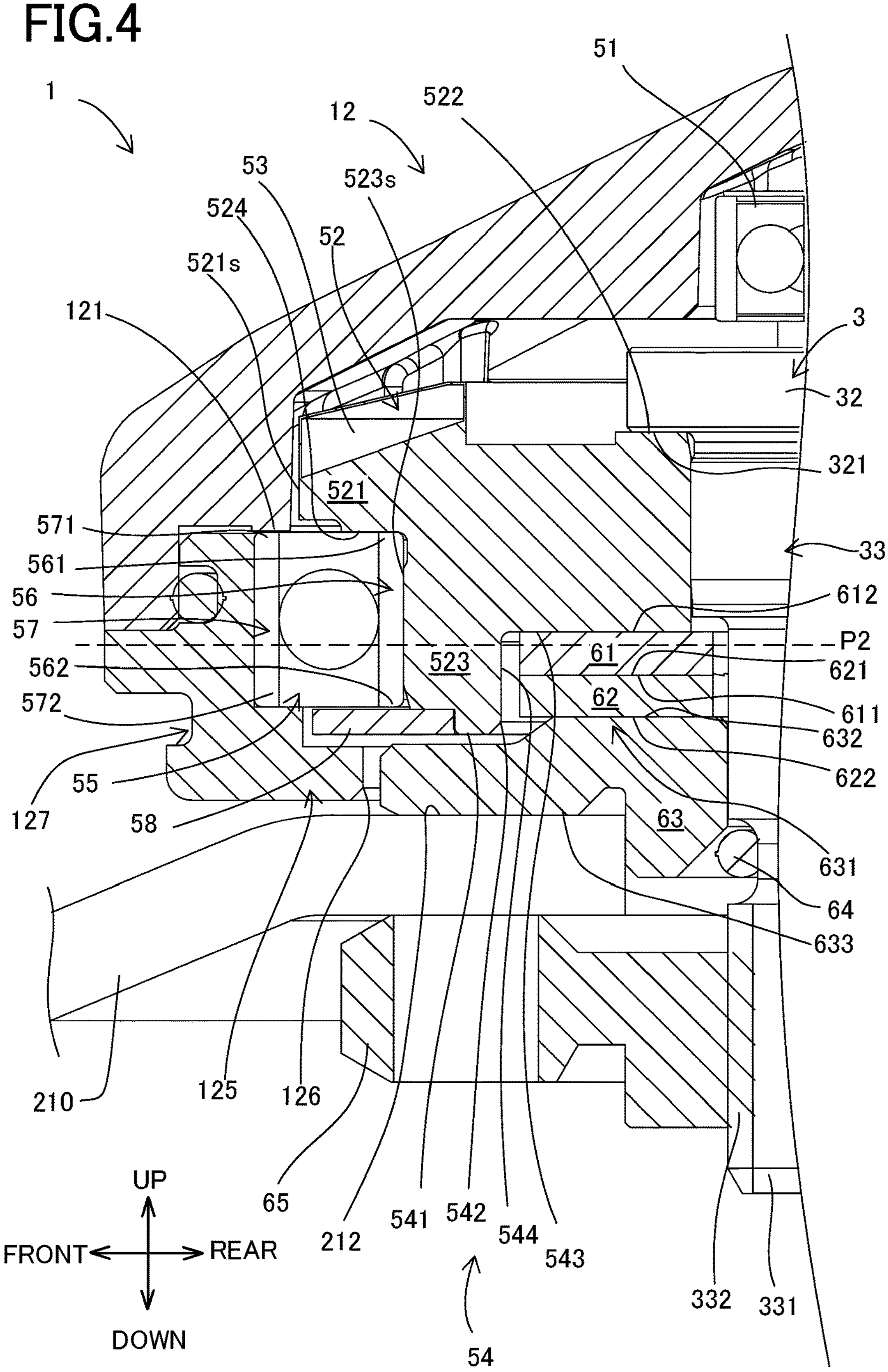
FIG. 4 is a partial, enlarged view of FIG. 3.

As shown in FIGS. 3 and 4, the lower end part 331 of the third outer diameter part 33 protrudes downward from a bearing box 125 that forms a bottom of the spindle housing part 12. The lower end part 331 of the spindle 3 has a male thread part 332. The lower end part 331 is configured such that a lock nut 65 (see FIG. 3) for mounting the tool accessory 210 to the spindle 3 is threadedly engaged therewith (fastened). The bearing box 125 has a second mounting part 127 for removably mounting the cover part 8 (a first mounting part 804).

Around the spindle 3, an upper bearing 51, the gear 52, a lower bearing 55, washers 61, 62 and an inner flange 63 are mainly provided. The spindle 3 is held on the spindle housing part 12 by the upper and lower bearings 51, 55 so as to be rotatable around the drive axis AX1. The centers of these parts in the radial direction are located on the drive axis AX1.

In this embodiment, the upper and lower bearings 51, 55 are rolling bearings. The upper bearing 51 is fitted onto (provided around) the first outer diameter part 31 of the spindle 3. An outer ring of the upper bearing 51 is held on the spindle housing part 12.

The gear 52 is fitted onto (provided around) the third outer diameter part 33 below the upper bearing 51. In this embodiment, the gear 52 is press-fitted onto the third outer diameter part 33 of the spindle 3 and can integrally rotate with the spindle 3. The gear 52 has an abutment part 522 that abuts the spindle 3, a tooth part 53 that engages with the small bevel gear 411, and a gear recess 54.

As shown in FIGS. 4 and 5, the gear 52 has a multistage shape having parts of different outer diameters in the up-down direction. The gear 52 has an upper part 521 and a lower part 522 having a smaller outer diameter than the upper part 521. A connection surface 524 between an outer peripheral surface 521*s* of the upper part 521 and an outer peripheral surface 523*s* of the lower part 523 is orthogonal to the up-down direction. The outer peripheral surfaces 521*s*, 523*s* are substantially parallel in the up-down direction. A radially inside part of the upper part 521 is recessed downward and an upper surface of this recess serves as an abutment part 522. The abutment part 522 abuts a lower surface of the second outer diameter part 32 of the spindle 3 and positions the gear 52 on the spindle 3.

The tooth part 53 is provided radially outward of the abutment part 522 and above the abutment part 522. The tooth part 53 transmits rotation of the motor shaft 21 to the spindle 3 via the output shaft 41 and the small bevel gear 411.

As shown in FIGS. 3 and 4, the gear recess 54 is a part recessed upward from an opening 542 formed in a lower surface (lower end part) 541 of the gear 52. The gear recess 54 is defined by the lower surface 541 of the gear 52, a bottom surface 543 located above the lower surface 541, and a side surface 544 that connects the lower surface 541 and the bottom surface 543. The side surface 544 is substantially parallel to the up-down direction, and the lower surface 541 and the bottom surface 543 are substantially orthogonal to the up-down direction.

The lower bearing 55 is arranged on the radially outer side of the gear 52. In this embodiment, the lower bearing 55 is arranged just on the radially outer side of the lower part 523 of the gear 52. Thus, as shown in FIGS. 3 and 4, an imaginary plane P2 orthogonal to the drive axis AX1 and passing through the lower bearing 55 passes through the gear 52. The plane P2 also passes through the gear recess 54, and therefore it can also be said that the lower bearing 55 is arranged on the radially outer side of the gear recess 54.

The lower bearing 55 supports the spindle 3 not directly, but via the gear 52 so as to be rotatable around the drive axis AX1. The height of the lower bearing 55 in the up-down direction is substantially equal to the height of the lower part 523 in the up-down direction. An inner ring 56 of the lower bearing 55 is fitted onto the outer peripheral surface 523*s* of the gear 52. An upper end 561 of the inner ring 56 abuts the connection surface 524 of the gear 52. In this embodiment, a sealing 58 is provided on the lower end part 541 of the gear 52. A lower end 562 of the inner ring 56 of the lower bearing 55 faces (substantially abuts) the sealing 58.

Figure 6:
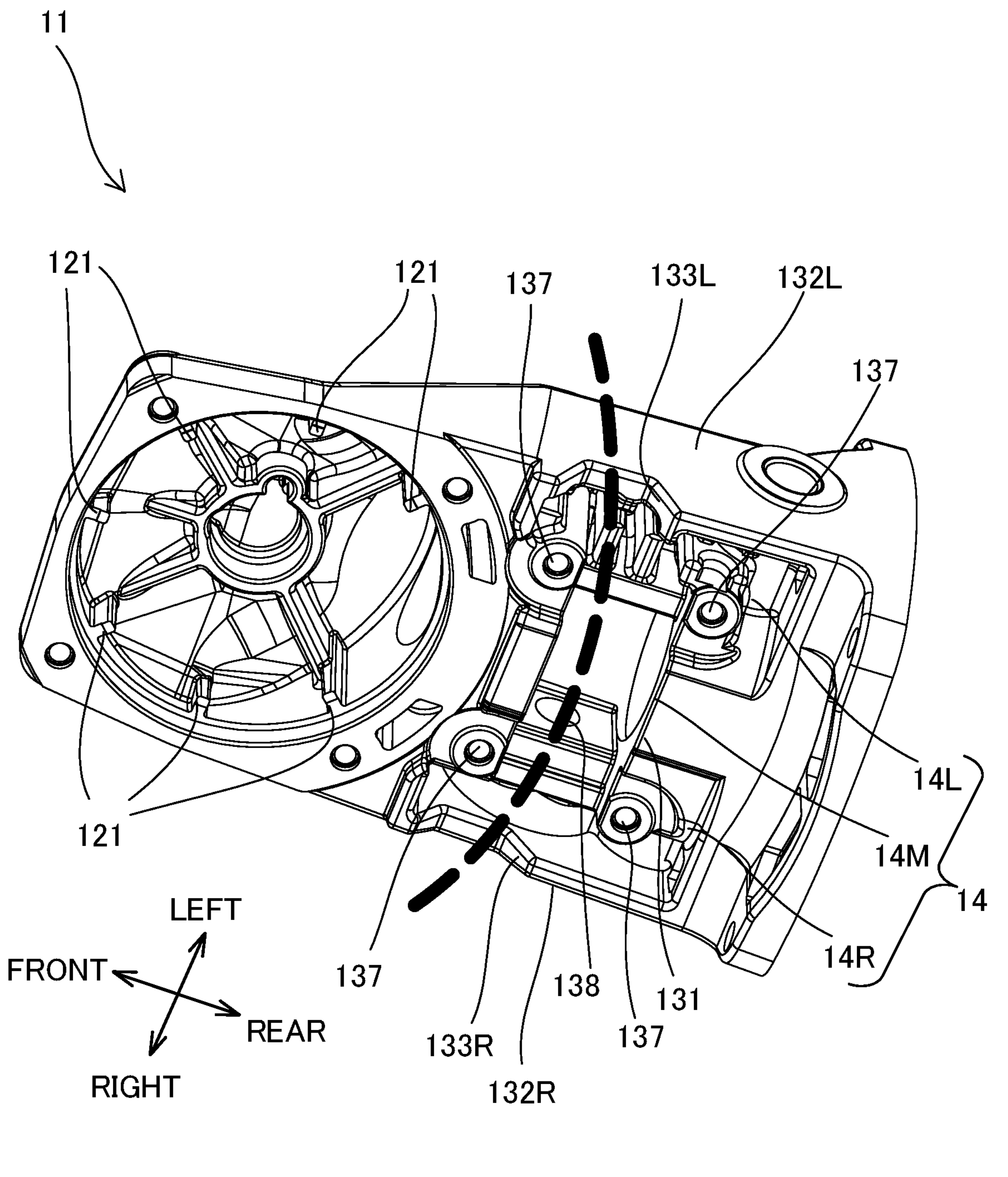
FIG. 6 is a bottom view of a gear housing, with a bearing box removed therefrom.

The lower bearing 55 has a larger outer diameter than the gear 52. Therefore, an outer ring 57 of the lower bearing 55 is located radially outward of the upper part 521 of the gear 52. The outer ring 57 of the lower bearing 55 is held by the spindle housing part 12. As shown in FIGS. 4 and 6, in this embodiment, a plurality of ribs 121 are provided on an inner wall of the spindle housing part 12 and protrudes downward. As shown in FIG. 4, each of the ribs 121 is formed in a position facing an upper end 571 of the outer ring 57. The ribs 121 abut the upper end 571.

As shown in FIGS. 3 to 5, the bearing box 125 is arranged on the radially outer side and the lower side of the lower bearing 55. The bearing box 125 forms a bottom part (lower end part) of the spindle housing part 12. The bearing box 125 has a through hole 126 formed therethrough in the up-down direction. The lower end part 331 of the spindle 3 protrudes downward from the through hole 126. In this embodiment, the bearing box 125 is configured to abut the radially outer side (outer surface) of the outer ring 57 of the lower bearing 55 and a lower end 572 of the outer ring 57.

The bearing box 125 has a second mounting part 127. The second mounting part 127 includes a generally groove-like part formed in an outer peripheral surface of the bearing box 125. The second mounting part 127 is configured to receive and hold the first mounting part 804 of the cover part 8 in the up-down direction.

A pair of washers 61, 62 are arranged within the gear recess 54. In this embodiment, the whole washers 61, 62 are arranged within the gear recess 54. The washers 61, 62 are fitted onto the third outer diameter part 33 of the spindle 3. In this embodiment, the outer diameter of the third outer diameter part 33 is reduced on the lower side of a press-fitted part onto which the gear 52 is press-fitted. The washers 61, 62 are fitted onto this lower part (small diameter part). Further, the washers 61, 62 are arranged to overlap with the lower bearing 55 in the up-down direction. In other words, the imaginary plane P2 orthogonal to the drive axis AX1 and passing through the lower bearing 55 passes through either of the washers 61, 62. It can also be said that at least part of the washers 61, 62 is located between the upper end 571 and the lower end 572 of the lower bearing 5 in the up-down direction.

The washers 61, 62 of this embodiment are configured to mechanically suppress (restrain) loosening by a self-locking action of a wedge structure. As shown in FIGS. 4 and 5, the washers 61, 62 respectively have cam faces 611, 621 facing each other in the up-down direction, and rib faces 612, 622 on the sides opposite to the cam faces 611, 621. Each of the cam faces 611, 621 has a cam angle larger than the angle of the thread of the male thread part 332. The rib face 612 of the upper washer 61 abuts the bottom surface 543 of the gear recess 54. The rib face 622 of the lower washer 62 abuts an upper surface 632 of the inner flange 63.

The inner flange 63 is fitted onto the above-described small diameter part of the third outer diameter part 33 just under the washer 62. The inner flange 63 is configured to position and fix the tool accessory 210 on the spindle 3. The through hole 126 of the bearing box 125 has a diameter larger than the outer diameter of the inner flange 63. An upper part of the inner flange 63 is arranged within the spindle housing part 12, and a lower part of the inner flange 63 is exposed downward from the spindle housing part 12. A lower surface 633 of the inner flange 63 abuts an upper surface 212 of the tool accessory 210. Further, an O-ring 64 is fitted on a radially inner side of the lower part of the inner flange 63. The O-ring 64 is an example of a fall-off preventing (restraining) member for restraining falling off of the inner flange 63.

As shown in FIGS. 4 and 5, a radially central part of the inner flange 63 protrudes upward from an outer edge of the inner flange 63. Part of this protruding part (protrusion 631) is housed in the gear recess 54. An upper surface 632 of the protrusion 631 abuts the rib face 622 of the washer 62.

The male thread part 332 is formed in an outer peripheral part of the lower end part 331 of the spindle 3 below the inner flange 63. The lock nut 65 is engaged with the male thread part 332. The tool accessory 210 is positioned and fixed to the spindle 3 by fastening the lock nut 65 with the tool accessory 210 held between the inner flange 63 and the lock nut 65.

With the above-described structure, when the switch 101 is turned on by a user and the motor 2 is driven, rotation of the motor shaft 21 is transmitted to the spindle 3 via the output shaft 41, the small bevel gear 411 and the tooth part 53 of the gear 52, while being decelerated. At this time, the direction of rotating motion is also changed from a direction around the rotational axis AX2 of the motor shaft 21 (or the rotational axis AX3 of the output shaft 41) to a direction around the drive axis AX1 of the spindle 3. Thus, the spindle 3 rotates around the drive axis AX1 and the tool accessory 210 fixed by the inner flange 63 and the lock nut 65 rotates together with the spindle 3.

As described above, in the grinder 1 of this embodiment, the lower bearing 55 is arranged on the radially outer side of the gear 52, and rotatably supports the spindle 3 via the gear 52. Therefore, compared with a structure in which the lower bearing 55 is directly fitted onto the spindle 3, the whole length of the spindle 3 can be shortened. Thus, the gear housing 11 can be reduced in height in the up-down direction. The grinder 1 of this embodiment can therefore perform an operation even in a relatively narrow space or other limited space.

Further, the gear 52 has the gear recess 54, and the gear recess 54 is configured to house at least part of a part or element fitted on the spindle 3. Thus, the whole length of the spindle 3 can be further shortened. In this embodiment, the gear recess 54 houses the whole washers 61, 62 and part of the inner flange 63. Thus, the whole length of the spindle 3 can be effectively shortened.

Even if the height of the gear 52 in the up-down direction is increased by the arrangement of the lower bearing 55 on the radially outer side of the gear 52, the radially inner side of a part of the gear 52 on which the lower bearing 55 is arranged is utilized as the gear recess 54. Thus, advantageously, parts to be fitted onto the spindle 3 below the gear 52 can be sufficiently housed in the gear recess 54.

Further, with the configuration in which the lower bearing 55 has a larger outer diameter than the gear 52, the outer ring 57 of the lower bearing 55 is easy to hold. In this embodiment, the upper end 571 of the outer ring 57 is held with the ribs 121 formed on the gear housing 11. This eliminates the need for separately providing a part for holding the outer ring 57, thus reducing the number of parts of the grinder 1.

The spindle 3 has the first outer diameter part 31, the second outer diameter part 32 having the largest outer diameter in the spindle 3 and the third outer diameter part 33 in this order from the top to the bottom. Thus, the gear 52 can be inserted into the spindle 3 from the lower end part 331 of the spindle 3 and positioned on the spindle 3. Further, the spindle 3 is held on the gear housing 11 by the lower bearing 55 via the gear 52, so that the spindle 3 is restrained from coming off downward from the gear housing 11.

The grinder 1 of this embodiment has a braking mechanism. The braking mechanism is provided to restrain the motor 2 from rotating by inertia when the switch 101 is turned off. In this embodiment, the grinder 1 has an electrical braking mechanism. Specifically, the controller 102 drives the motor 2 in reverse when the switch 101 is turned off, and, for example, after a lapse of a prescribed time or when the motor 2 rotates to a prescribed position around the rotational axis AX2, the controller 102 stops power supply to the motor 2. Thus, the spindle 3 is restrained from rotating by inertia. As a result, advantageously, the grinder 1 (rotation of the tool accessory 210 around the drive axis AX1) can be stopped earlier.

Where the tool accessory 210 having a relatively large mass is used, when rotation of the tool accessory 210 is suddenly stopped by the braking mechanism, the fastened lock nut 65 may be loosened and thus the tool accessory 210 fixed to the spindle 3 may be loosened. In this embodiment, axial force is applied along the drive axis AX1 by the washers 61, 62, so that loosening of the fastened lock nut 65 is effectively suppressed. Therefore, in the grinder 1 of this embodiment, the whole length of the spindle 3 can be shortened while loosening of the fastened lock nut 65 is suppressed.

<Structure of the Cover Part>

The cover part 8 is now described. The cover part 8 includes a cover body 80 and a lock plate 81.

Figure 7:
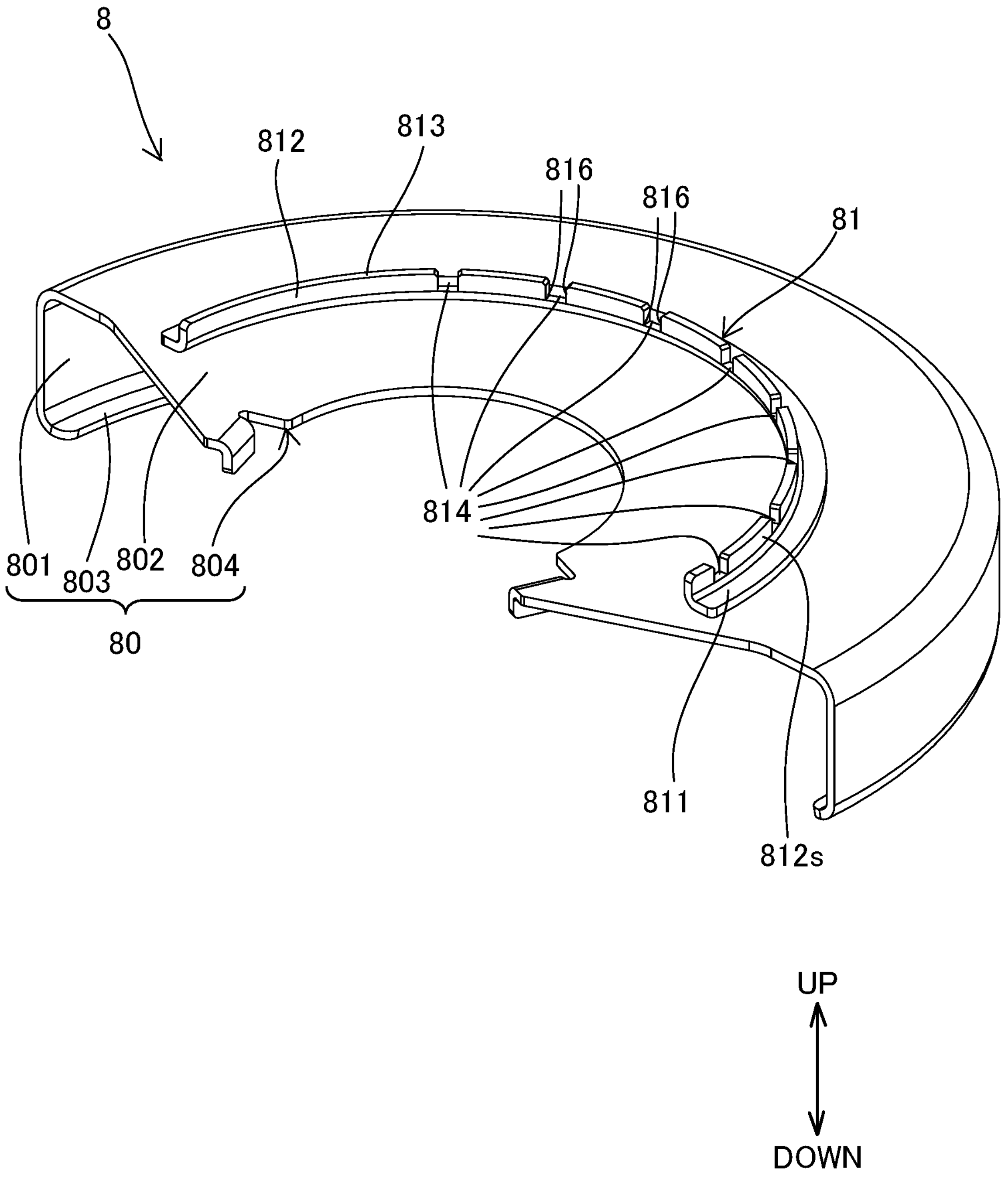
FIG. 7 is an external perspective view of a cover part.
Figure 8:
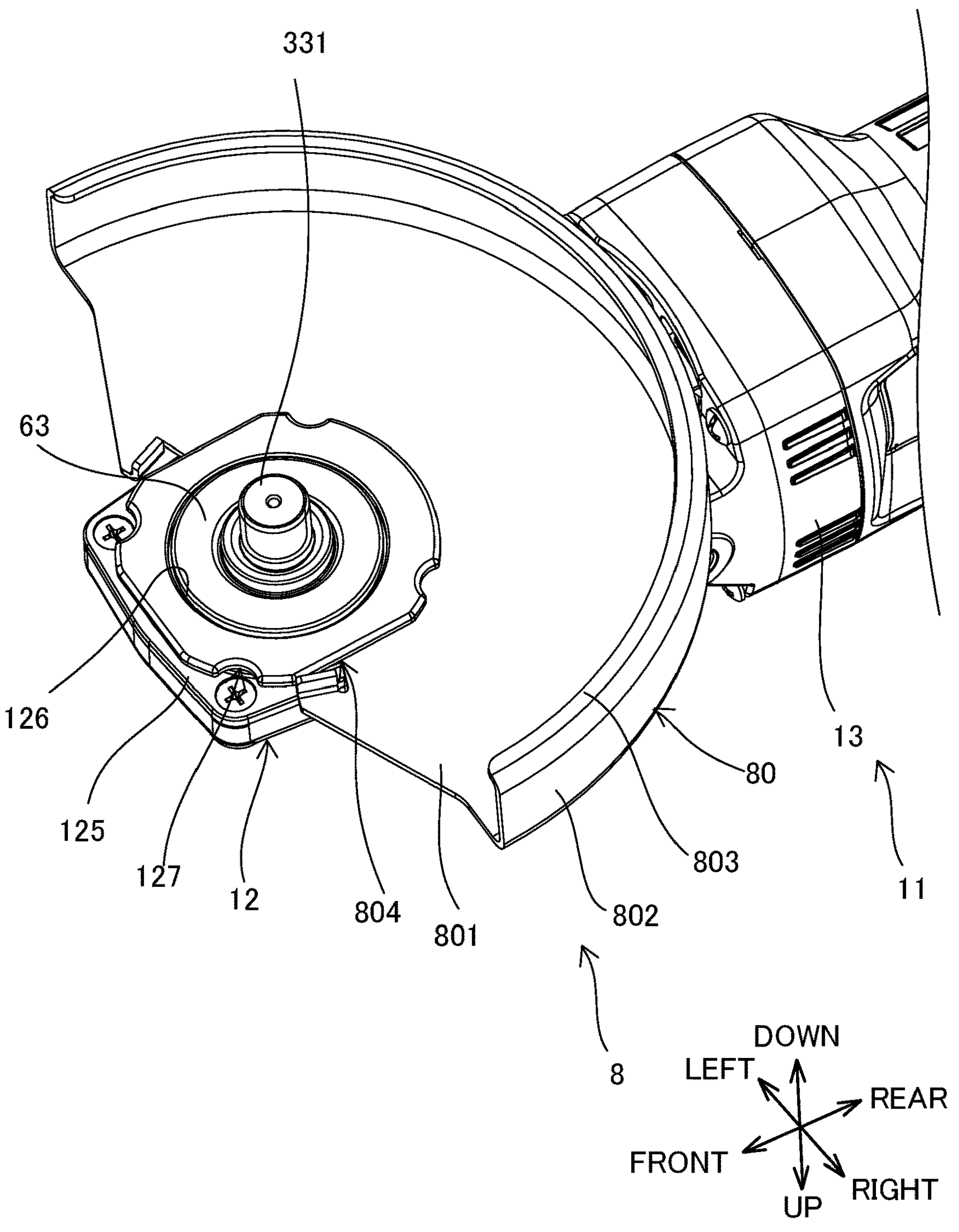
FIG. 8 is a bottom view of the grinder, with a tool accessory removed therefrom.

The cover body 80 is configured to cover part of the tool accessory 210. For example, in FIGS. 1 to 3, the cover body 80 covers a substantially upper rear half of the tool accessory 210. As shown in FIG. 7, the cover body 80 has an arcuate part 801, a plate-like part 802 and a first mounting part 804. The arcuate part 801 has an arcuate shape having a larger radius than the tool accessory 210 having a generally disc-like shape. The arcuate part 801 partially covers an outer edge part 211 of the tool accessory 210. An arcuate lower end part of the arcuate part 801 forms a bent part 803 bent radially inward. The plate-like part 802 extends radially inward from the whole of an arcuate upper end of the arcuate part 801. The plate-like part 802 partially covers the upper surface 212 of the tool accessory 210.

The first mounting part 804 is a generally arcuate part of the plate-like part 802 and extends along the circumferential direction around the drive axis AX1. The first mounting part 804 has two facing flanges on both ends in the circumferential direction. The first mounting part 804 is removably mounted to the second mounting part 127 of the spindle housing part 12 (the bearing box 125). In order to fit the first mounting part 804 into the second mounting part 127, a user places the cover part 8 in front of the grinder 1 such that the first mounting part 804 is faced with the second mounting part 127, and moves the cover part 8 rearward. The second mounting part 127 receives and holds the cover part 8 in the up-down direction.

The lock plate 81 is provided on an upper surface of the plate-like part 802 of the cover body 80. The lock plate 81 has a generally arcuate shape centering on the drive axis AX1 as a whole. The lock plate 81 has a fixed part 811 fixed to the plate-like part 802, and a protruding part 812 protruding upward from the fixed part 811. The protruding part 812 extends in the up-down direction. The protruding part 812 has grooves 814 open upward. The grooves 814 are arranged at prescribed intervals in the circumferential direction. When the first mounting part 804 is mounted to the second mounting part 127 as described above and an operation lever 9 (described below in detail) is in a disengagement position, the cover part 8 can be turned in the circumferential direction. When the cover part 8 is turned in the circumferential direction, part of the protruding part 812 is placed in the recess 15. In place of the above-described cover part 8, a cover part having a different outer diameter from the cover part 8 but having the same arrangement relation between the lock plate 81 and the first mounting part 804 as the cover part 8 can be mounted to the grinder 1 (the second mounting part 127). The recess 15 and the operation lever 9 are now described.

<Structure of the Recess>

The recess 15 is now described with reference to FIGS. 3, 6 and 9 to 11. The recess 15 is mainly defined by the opening 14 formed in the shaft housing part 13 and the lower cover 7 for closing the opening 14. The opening 14 is formed in the lower surface 131 of the shaft housing part 13. The opening 14 is formed between the first and second bearings 43, 44 in the front-rear direction (see FIG. 3). In this embodiment, the opening 14 is formed to extend across the shaft housing part 13 in the left-right direction between the first and second bearings 43, 44 (see FIG. 6). Specifically, the opening 14 is formed through a left wall (left side surface) 132L and a right wall (right side surface) 132R of the shaft housing part 13 below the output shaft 41 and the spacer 45.

As shown in FIG. 6, the opening 14 includes a central opening part 14M formed just below the spacer 45, a left opening part 14L formed on the left side of the spacer 45, and a right opening part 14R formed on the right side of the spacer 45. The left and right opening parts 14L, 14R are larger than the central opening part 14M in the front-rear direction. A through part 133L that is formed through the left wall (left side surface) 132L in the left opening part 14L, and a through part 133R that is formed through the right wall (right side surface) 132R in the right opening part 14R are located forward of the central opening part 14M. Therefore, as shown by a broken line in FIG. 6, the opening 14 extends across the shaft housing part 13 in a generally arcuate shape as a whole.

Figure 10:
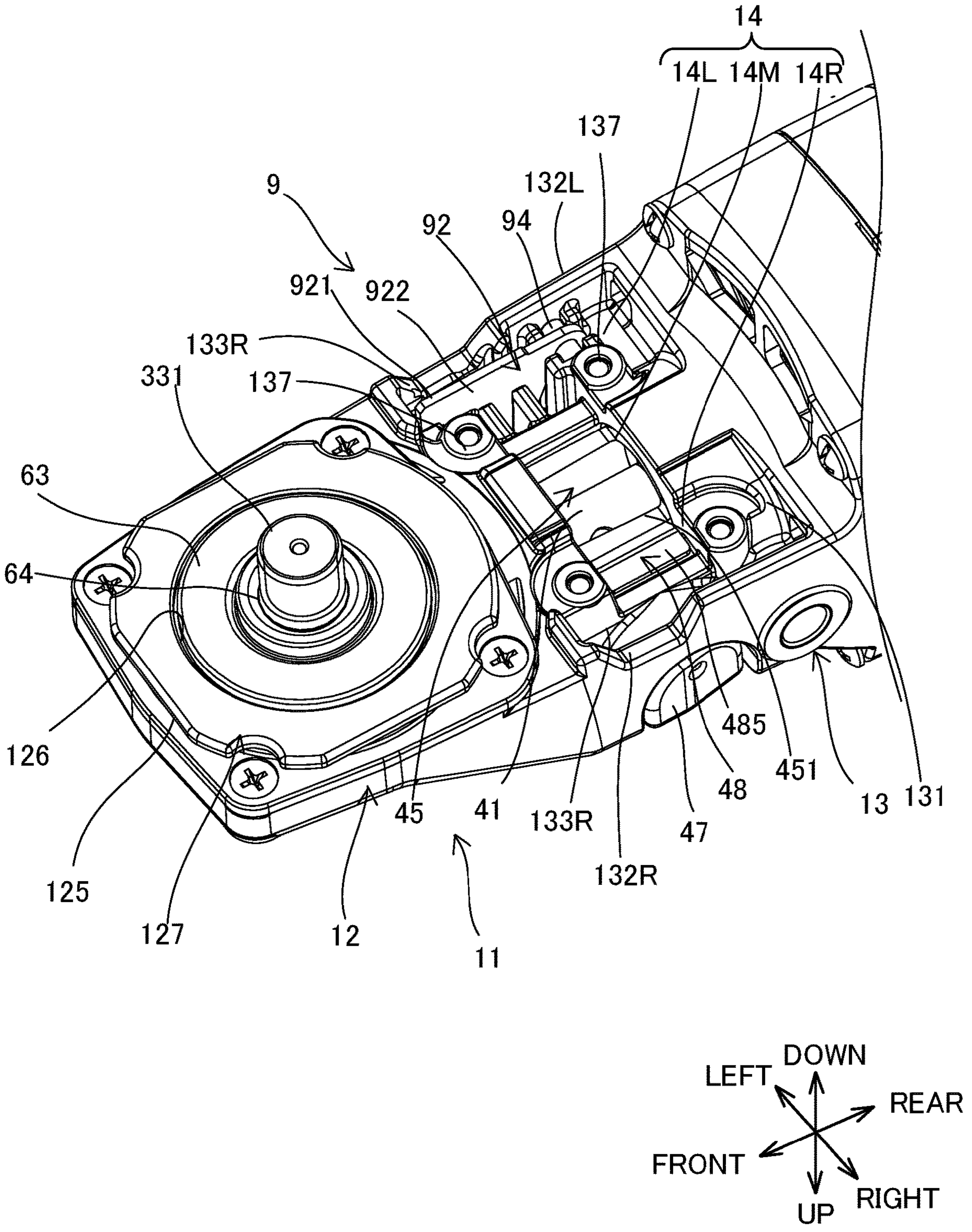
FIG. 10 is a bottom view of the grinder, with a lower cover removed therefrom.
Figure 11:
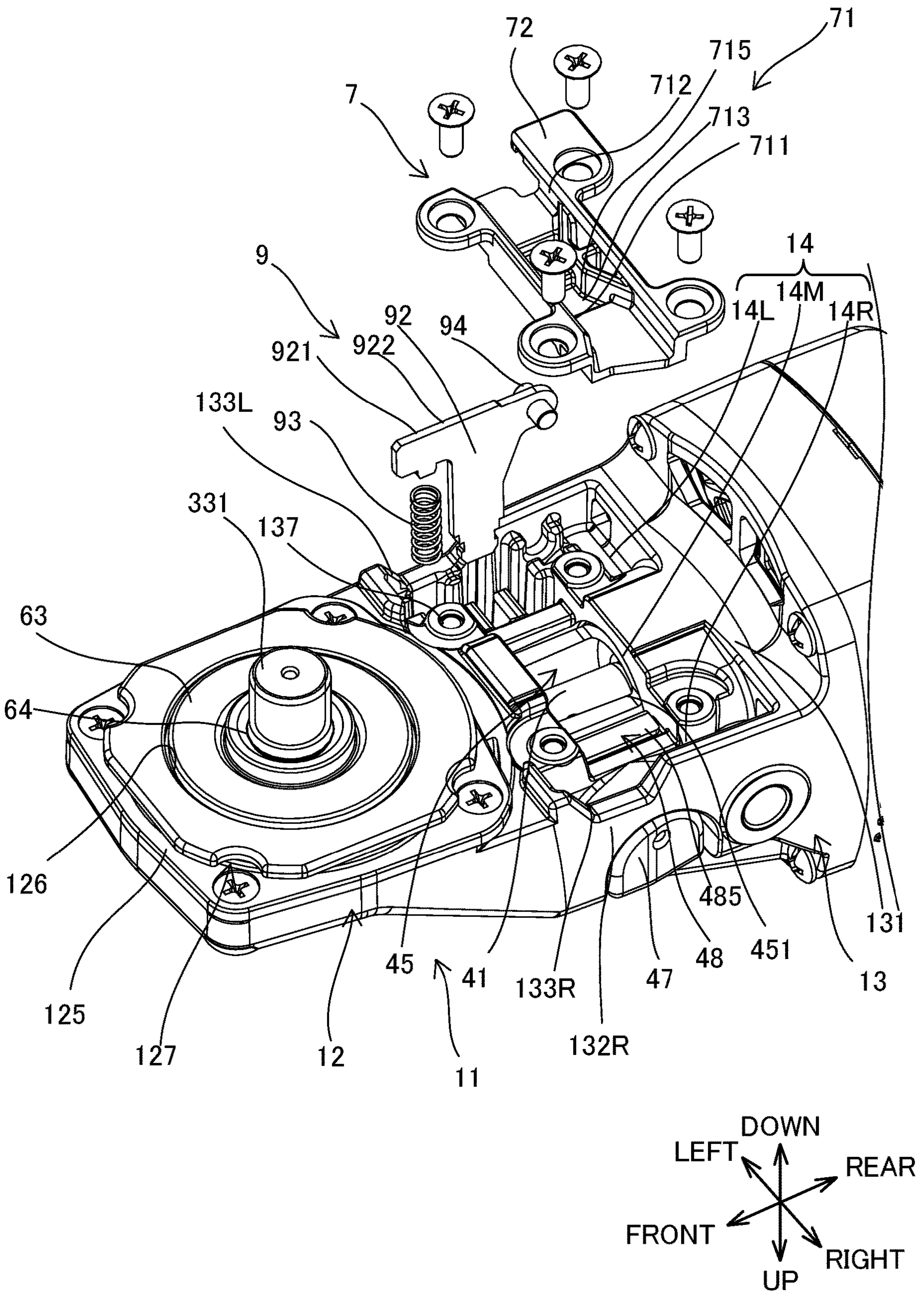
FIG. 11 is a partial, exploded perspective view of the grinder.

As shown in FIGS. 3, 10 and 11, a spacer opening 451 is formed in a lower part of the spacer 45. As shown in FIG. 10, the spacer opening 451 is formed to conform to the shape of the opening 14 (the central opening part 14M). As shown in FIG. 3, the spacer opening 451 is formed between the first and second abutment parts 453, 454 in a lower part of the spacer 45.

The lower cover 7 is now described with reference to FIGS. 3, 9 and 11. The lower cover 7 covers part of the opening 14. The lower cover 7 is fixed to the shaft housing part 13 by screws being screwed into screw holes 137 formed in the lower surface 131 of the shaft housing part 13. In this embodiment, as shown in FIG. 9, the lower cover 7 is arranged inward of the left wall (left side surface) 132L and the right wall (right side surface) 132R in the left-right direction.

Figure 9:
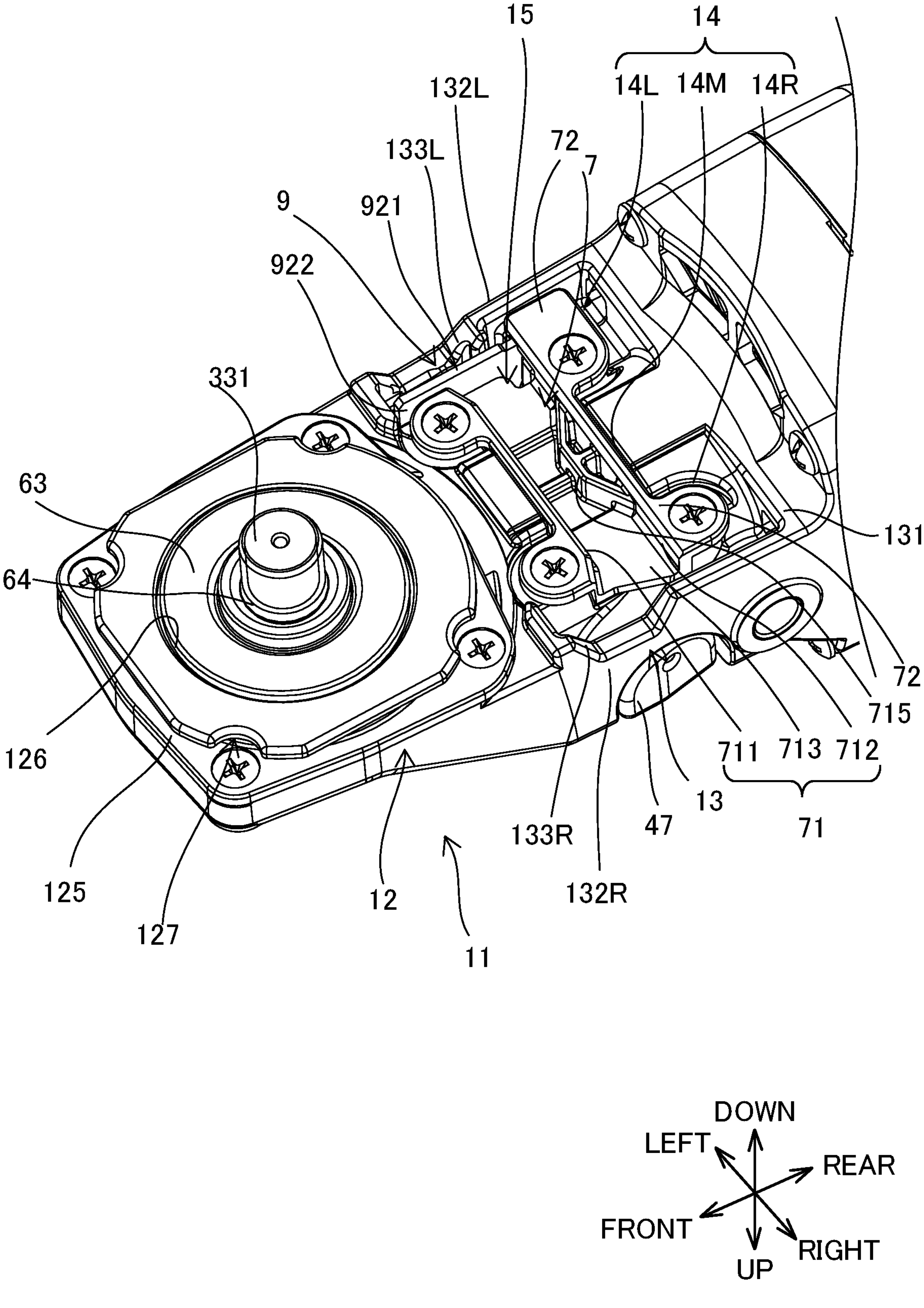
FIG. 9 is a bottom view of the grinder, with the tool accessory and the cover removed therefrom.

As shown in FIG. 9, the lower cover 7 has a lower surface 72 and a groove 71 recessed upward from the lower surface 72. The groove 71 extends in the left-right direction between the first and second bearings 43, 44 (below the output shaft 41). Left and right ends of the groove 71 are open. The groove 71 is defined by a front surface 711, a rear surface 712 arranged rearward of the front surface 711, and a bottom surface 713. The front and rear surfaces 711, 712 are orthogonal to the front-rear direction. The bottom surface 713 is arranged above the lower surface 72 of the lower cover 7 and is orthogonal to the up-down direction. As shown in FIG. 3, the bottom surface 713 is located within the spacer opening 451 (within the spacer 45). The spacer opening 451 is covered by the groove 71 of the lower cover 7. The central opening part 14M and the spacer opening 451 are partitioned (separated) from the left and right opening parts 14L, 14R by the groove 71 of the lower cover 7 and a cylindrical wall of the spacer 45 and do not communicate with the outside. Therefore, the lower cover 7 restrains entry of dust from the outside into a space in which the output shaft 41 is arranged in the shaft housing part 13.

As described above, the recess 15, which is recessed upward and extends across the shaft housing part 13 in the left-right direction, is defined under the gear housing 11 (the shaft housing part 13) by the opening 14 of the shaft housing part 13, the spacer opening 451 and the groove 71 of the lower cover 7. Further, as described above, the through part 133L that is formed through the left wall (left side surface) 132L in the left opening part 14L and the through part 133R that is formed through the right wall (right side surface) 132R in the right opening part 14R are located forward of the central opening part 14M. Further, the lower cover 7 is arranged inward of the left wall (left side surface) 132L and the right wall (right side surface) 132R. Thus, the recess 15 extends across the shaft housing part 13 in a generally arcuate shape as a whole.

Figure 12:
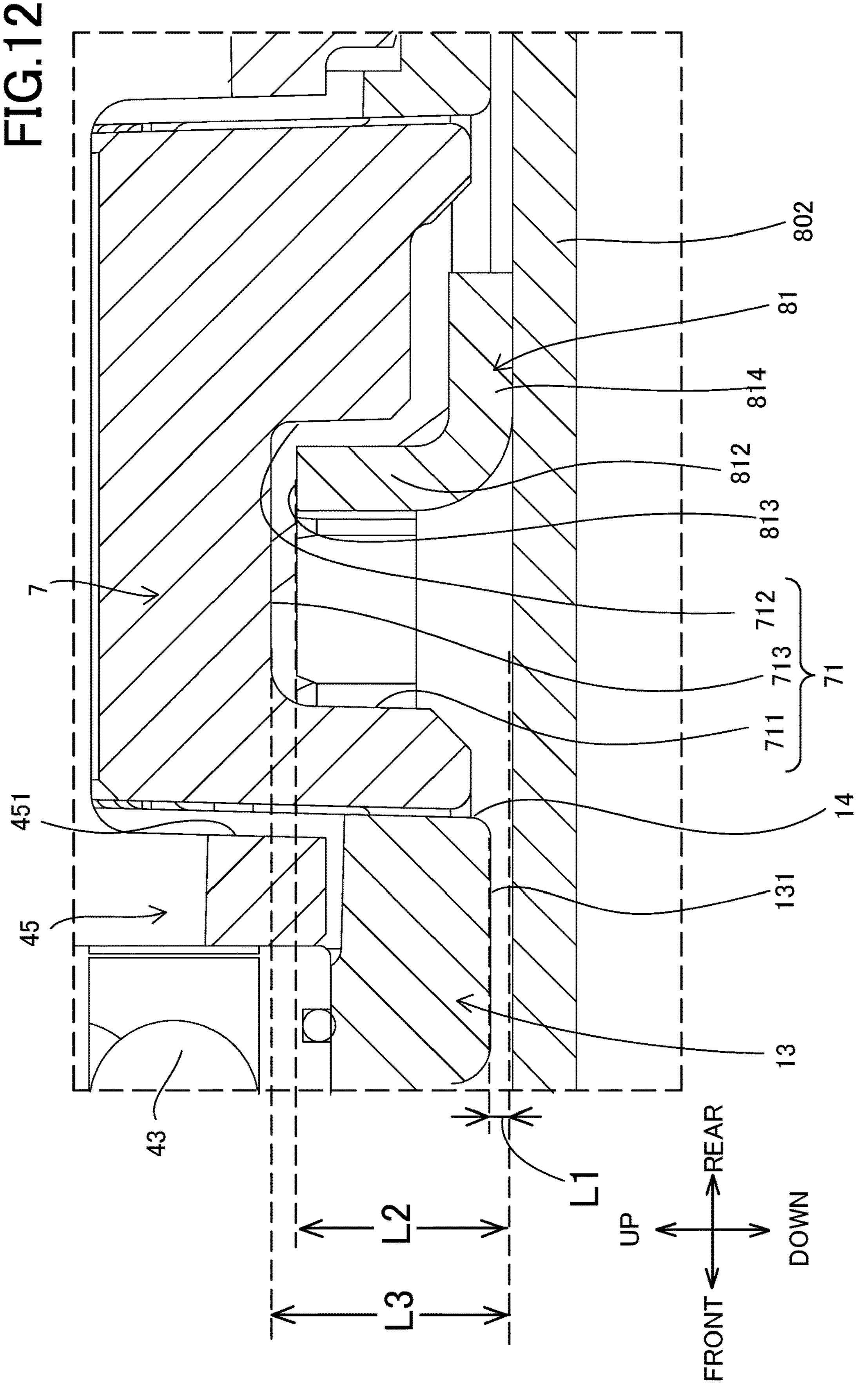
FIG. 12 is an enlarged view of a part circled by a broken line X1 in FIG. 2.

The arrangement relation between the recess 15 and the cover part 8 is shown in FIG. 12. In FIG. 12, a distance between the plate-like part 802 of the cover part 8 and the lower surface 131 of the shaft housing part 13 is shown by L1, and a distance between the plate-like part 802 of the cover part 8 and an upper end 813 of the lock plate 81 is shown by L2. The distance L2 is also the height of the lock plate 81. A distance between the plate-like part 802 of the cover part 8 and the bottom surface 713 of the groove 71 of the lower cover 7 is shown by L3. In this embodiment, the distance L2 is longer than the distance L1 and shorter than the distance L3. Thus, by provision of the recess 15 in the shaft housing part 13, the lock plate 81 having some height (the distance L2) in the up-down direction can be used to engage the cover part 8 with the gear housing 11.

As described above, the grinder 1 of this embodiment has the recess 15 formed in the shaft housing part 13. The lock plate 81 can be arranged within the recess 15. Therefore, a space between the first and second bearings 43, 44 in the shaft housing part 13 can be effectively utilized, and the distance L1 between the gear housing 11 and the plate-like part 802 of the cover part 8 can be shortened. Therefore, the grinder 1 of this embodiment is advantageous in that the grinder 1 can be reduced in height in the up-down direction by close arrangement of the gear housing 11 and the cover part 8.

<Structure of the Operation Lever>

The operation lever 9 is now described. As shown in FIG. 2, the operation lever 9 is arranged in the gear housing 11. The operation lever 9 can be moved between a disengagement position for allowing rotation of the cover part 8 in the circumferential direction and an engagement position for restricting rotation of the cover part 8 in the circumferential direction.

Figure 14:
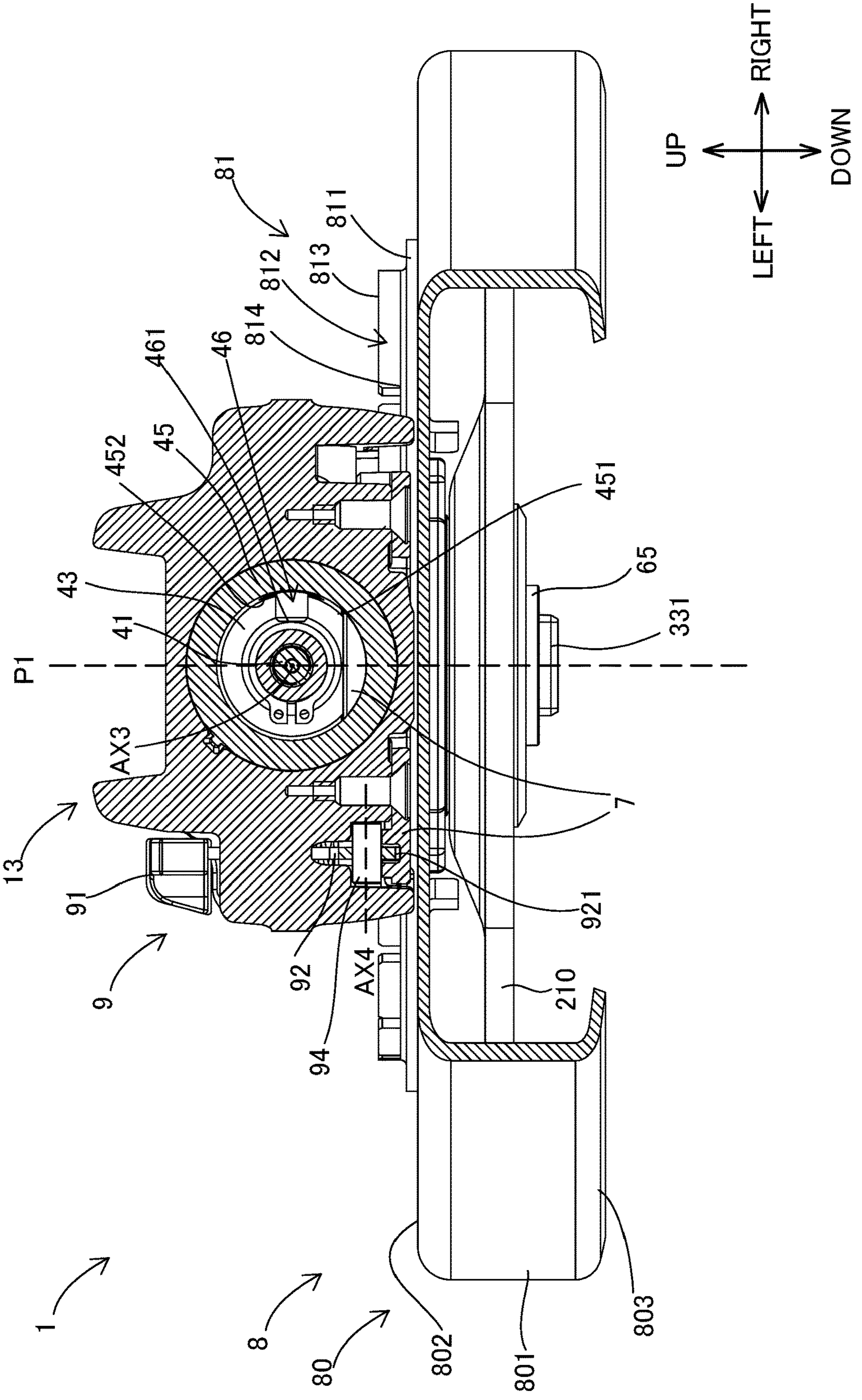
FIG. 14 is a sectional view taken along line XIV-XIV in FIG. 13.
Figure 15:
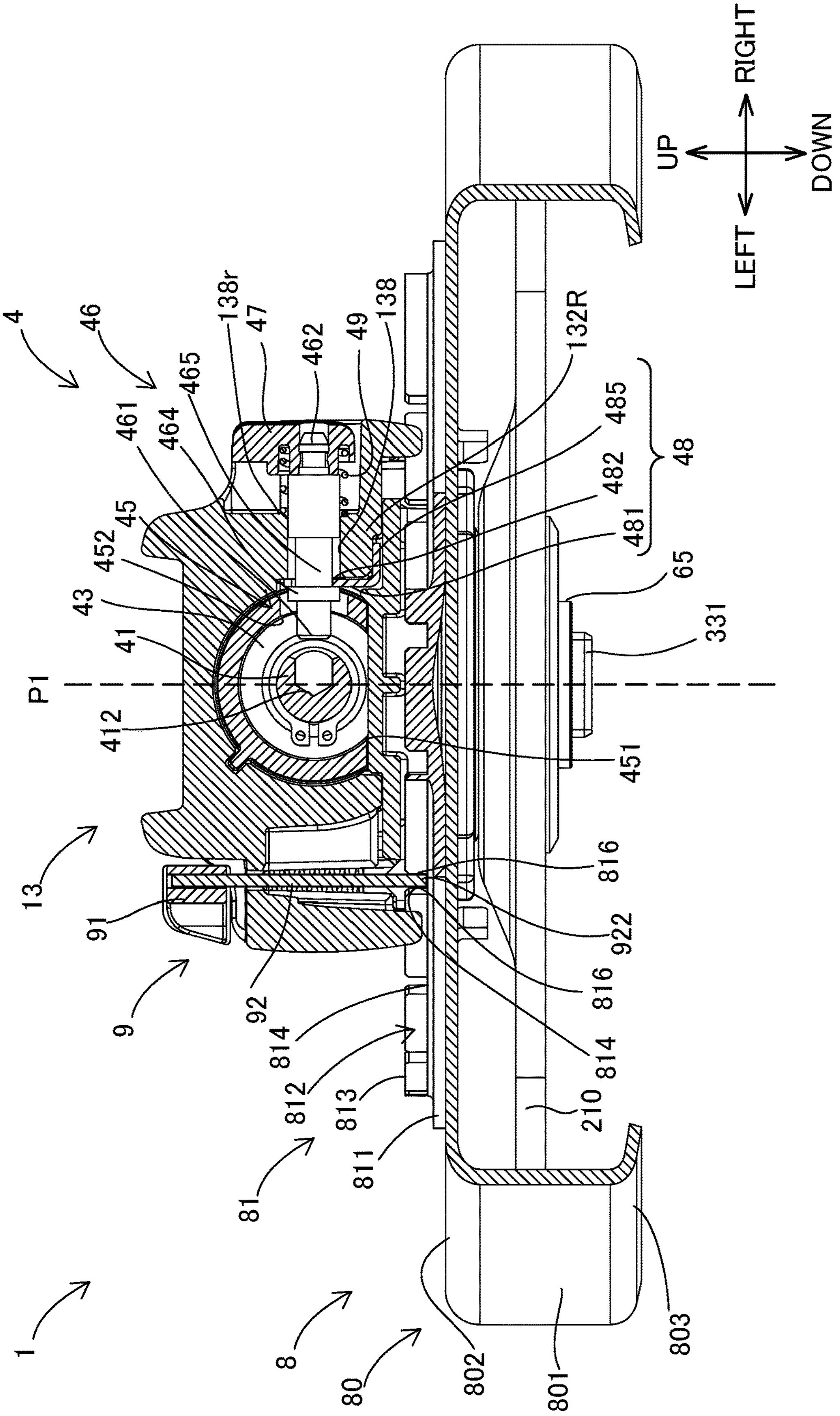
FIG. 15 is a sectional view taken along line XV-XV in FIG. 2.

In FIGS. 14 and 15, an imaginary plane P1 including the drive axis AX1 and the rotational axis AX3 is shown. In this embodiment, the operation lever 9 as a whole is arranged substantially in parallel to the plane P1 on the left side of the spacer 45 in the shaft housing part 13. As shown in FIGS. 10 and 11, most of the operation lever 9 is arranged in (a position corresponding to) the left opening part 14L within the shaft housing part 13.

Figure 13:
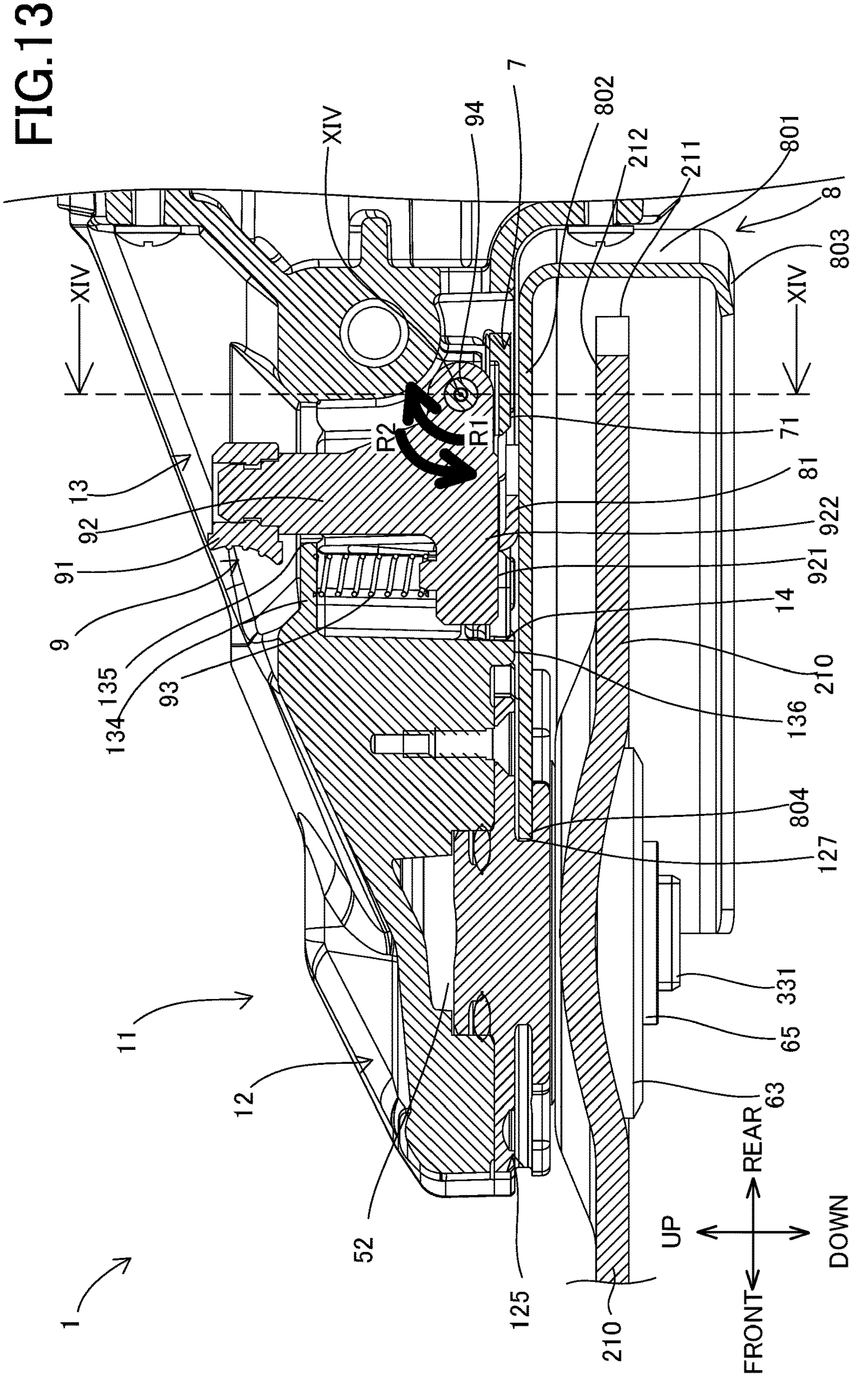
FIG. 13 is a sectional view taken along line XIII-XIII in FIG. 2.

As shown in FIG. 13, the operation lever 9 has an operation part 91 configured to be manually operated by a user, a body part 92, a biasing member 93 and a rotary shaft 94. The body part 92, the biasing member 93 and the rotary shaft 94 are arranged within the shaft housing part 13. The operation part 91 is exposed upward from an opening 135 that is formed in an upper surface 134 of the shaft housing part 13.

The body part 92 has a plate-like shape and is arranged in parallel to the plane P1. The rotary shaft 94 protrudes in the left-right direction from a rear lower part of the body part 92 and is held on a lower part of the shaft housing part 13. The body part 92 can be turned around the rotary shaft 94. As shown in FIG. 14, the extending direction of the rotational axis AX4 of the operation lever 9 is orthogonal to the plane P1. In the following description, a part of the body part 92 forward of the rotary shaft 94 is also referred to as an engagement part 922.

As shown in FIG. 9, a part of the body part 92 under the rotary shaft 94 is covered by the lower cover 7, but the engagement part 922 is not covered by the lower cover 7. In other words, the lower cover 7 covers a part of the left opening part 14L under the rotary shaft 94 while the engagement part 922 is exposed in the left opening part 14L.

As shown in FIG. 13, the biasing member 93 is arranged between a front upper part of the body part 92 and the upper surface (upper wall) 134 of the shaft housing part 13 and biases the body part 92 downward. In this embodiment, a compression coil spring is used as the biasing member 93. Normally or when the operation lever 9 is not operated, the engagement part 922 is biased downward by the biasing member 93. A lower end 921 of the body part 92 is normally located in the same position as or slightly above a lower end 136 of the shaft housing part 13 in the up-down direction (see FIG. 13). Further, part (the engagement part 922) of the body part 92 is normally located just beside the groove 71 of the lower cover 7 within the recess 15 (see FIG. 9). This position of the operation lever 9 is also referred to as an "engagement position".

When a user pushes the operation part 91 rearward against the biasing force of the biasing member 93, the body part 92 turns around the rotational axis AX4 in a direction shown by arrow R1 in FIG. 13. Thus, the engagement part 922 moves rearward and upward. As a result, the engagement part 922 moves upward of the bottom surface 713 of the groove 71 of the lower cover 7 in the up-down direction. Thus, the engagement part 922 moves (retracts) upward of the recess 15. This position of the operation lever 9 is also referred to as a "disengagement position". When a user releases (pushing of) the operation part 91, the body part 92 turns in a direction shown by arrow R2 in FIG. 13 and returns from the disengagement position to the engagement position.

The manner of restricting circumferential movement (turn, rotation) of the cover part 8 is now described. First, a user fits the first mounting part 804 of the cover part 8 to the second mounting part 127 of the spindle housing part 12 from the front. At this time, when the user pushes the operation part 91, the engagement part 922 moves to the disengagement position. When the user turns the cover part 8 in the circumferential direction with the engagement part 922 placed in the disengagement position, the lock plate 81 is moved in the circumferential direction along the recess 15, and part of the protruding part 812 of the lock plate 81 is placed in the recess 15.

When the user turns the cover part 8 to a desired position in the circumferential direction and releases the operation lever 9, the engagement part 922 returns to the engagement position by being biased by the biasing member 93. At this time, when one of the grooves 814 of the protruding part 812 is located just below the operation lever 9, the groove 814 is engaged with the engagement part 922. Thus, the groove 814 restricts circumferential movement of the cover part 8. More specifically, walls 816 (see FIGS. 7 and 15) of the protruding part 812 that define the groove 814 abut a left or right surface of the engagement part 922 (the body part 92) of the operation lever 9 and thereby restrict the circumferential movement of the cover part 8.

When the pushing operation of the user is released, not the groove 814 but the upper end 813 of the protruding part 812 may be located just below the operation lever 9 (the engagement part 922). In this case, the lower end 921 of the operation lever 9 abuts the upper end 813. When the user further turns the cover part 8 in the circumferential direction in this state until the groove 814 moves just below the operation lever 9 (the engagement part 922), the engagement part 922 is moved downward by the biasing force from the position abutting on the upper end 813 of the protruding part 812 and engaged with the groove 814. In this manner, the user can position the cover part 8 in a prescribed position in the circumferential direction.

As shown in FIG. 9, in this embodiment, the lower cover 7 has a protrusion 715 protruding forward from the rear surface 712 of the groove 71. The protrusion 715 is formed in a substantially central part of the groove 71 in the left-right direction. The plane P1 passes through the protrusion 715. The width in the front-rear direction of a part of the groove 71 in which the protrusion 715 is formed is smaller than the width in the front-rear direction of the other part of the groove 71. The protrusion 715 is configured to abut an outer surface 812*s* (see FIG. 7) of the protruding part 812 of the lock plate 81 arranged in the groove 71. The protrusion 715 guides circumferential movement of the lock plate 81 (the cover part 8) by sliding on the outer surface 812*s* of the protruding part 812. Further, the protrusion 715 abuts the outer surface 812*s* of the protruding part 812 and presses the first mounting part 804 of the cover part 8 onto the second mounting part 127 of the gear housing 11. The protrusion 715 also serves as a movement restricting part that restricts movement of the protruding part 812 (the cover part 8) relative to the lower cover 7 in a direction (the front-rear direction) crossing the drive axis AX1. This restrains the cover part 8 from moving during operation using the grinder 1, even if rattling (accidental loosening, gap) exists between the groove 71 of the lower cover 7 and the protruding part 812 of the lock plate 81.

<Structure of the Shaft Lock Mechanism>

As shown in FIG. 15, the grinder 1 further has a shaft lock mechanism 4. The shaft lock mechanism 4 is provided to restrict rotation of the spindle 3 via the small bevel gear 411 and the gear 52 by restricting rotation of the output shaft 41. The lock nut 65 needs to be turned relative to the spindle 3 in order to mount and remove the tool accessory 210 to and from the spindle 3. The output shaft 41 connected to the motor shaft 21 can however rotate freely even if the motor 2 is stopped. Therefore, if a user tries to simply turn the lock nut 65, the spindle 3 also rotates together. At this time, when the shaft lock mechanism 4 is actuated to restrict rotation of the output shaft 41, rotation of the spindle 3 is restricted and the lock nut 65 can be turned.

In this embodiment, the shaft lock mechanism 4 mainly includes a pin 46 that can move within the shaft housing part 13, an insertion hole 412 that is formed in the output shaft 41 such that an end part 461 of the pin 46 can be inserted therein, and a stopper 48. The shaft lock mechanism 4 as a whole is arranged on the side opposite to the operation lever 9 with respect to the plane P1. In this embodiment, the shaft lock mechanism 4 is arranged on the right side of the plane P1.

The insertion hole 412 is formed in a direction orthogonal to the rotational axis AX3 in the output shaft 41. The insertion hole 412 is formed between the first and second bearings 43, 44 in the front-rear direction.

The pin 46 is disposed in the shaft housing part 13 so as to be movable in a direction orthogonal to the plane P1. The pin 46 can be moved between a first position for engagement with the output shaft 41 and a second position for disengagement from the output shaft 41. In this embodiment, a through hole 138 is formed through a right wall 132R of the shaft housing part 13 in the left-right direction. The through hole 138 is formed just beside the insertion hole 412. The pin 46 can be moved through the through hole 138 in the left-right direction. The spacer 45 has a right opening 452 formed in (a position corresponding to) the through hole 138.

The pin 46 has the first end part 461 and a second end part 462 on the side opposite to the first end part 461. The first end part 461 is arranged within the shaft housing part 13 and can be engaged with the insertion hole 412. The second end part 462 is exposed to the right of the shaft housing part 13 from the through hole 138. The first position is a position where the first end part 461 of the pin 46 is engaged with the insertion hole 412. In this embodiment, the pin 46 moves to the first position by being moved in a direction toward the plane P1 (from right to left). The second position is a position where the first end part 461 is disengaged from the insertion hole 412. In this embodiment, the pin 46 moves to the second position by being moved in a direction away from the plane P1 (from left to right).

The pin 46 further has a flange 464 protruding radially outward from a body part 465 of the pin 46. The outer diameter of the flange 464 is larger than the diameter of the insertion hole 412 and smaller than the diameter of the right opening 452 of the spacer 45.

An operation part 47 is provided on the second end part 462 and configured to be manually operated by a user. A biasing spring 49 is provided between the operation part 47 and a part of the right wall 132R around an outlet (a right opening 138*r*) of the through hole 138. The biasing spring 49 biases the pin 36 to the right. The pin 46 is normally placed in the second position by the biasing force of the biasing spring 49.

The stopper 48 is configured to restrain the pin 46 from coming off from the shaft housing part 13. In this embodiment, the stopper 48 is generally L-shaped in a cross-sectional view orthogonal to the front-rear direction. The stopper 48 has a first plate part 481 orthogonal to the left-right direction, and a second plate part 485 extending from a lower end part of the first plate part 481 to the right.

The first plate part 481 is arranged between the spacer 45 and the right wall 132R of the shaft housing part 13 in the left-right direction. The first plate part 481 has a hole 482 formed therethrough in the left-right direction. The diameter of the hole 482 is larger than the outer diameter of the body part 465 of the pin 46 and smaller than the outer diameter of the flange 464 of the pin 46. The hole 482 is open at an upper end of the first plate part 481. The second plate part 485 is formed substantially orthogonally to the up-down direction. The second plate part 485 is arranged just above the groove 71 of the lower cover 7 in an upper part of the right opening part 14R. The length of the stopper 48 in the front-rear direction is substantially equal to the width of the groove 71 in the front-rear direction. The stopper 48 is held within the shaft housing part 13 by the lower cover 7.

The manner of restricting rotation of the spindle 3 via the output shaft 41 using the shaft lock mechanism 4 is now described. A user turns the spindle 3 by turning the tool accessory 210 by hand while pushing the operation part 47 in order to find out a rotational position of the output shaft 41 to allow insertion of the pin 46. The position to allow insertion of the pin 46 is a position where the insertion hole 412 of the output shaft 41 is adjacent to the right opening 452 of the spacer 45. When the output shaft 41 is rotated to the position to allow insertion of the pin 46, the first end part 461 of the pin 46 is inserted into the insertion hole 412 of the output shaft 41. Thus, the pin 46 is moved to the first position and engaged with the output shaft 41, so that rotation of the output shaft 41 is restricted. The user can fasten or loosen the lock nut 65 while pushing the operation part 47. When the user loosens the pushing of the operation part 47, the pin 46 returns to the right second position by the biasing force of the biasing spring 49. As a result, the output shaft 41 is allowed to rotate. At this time, the flange 464 of the pin 46 abuts a left surface of the first plate part 481 of the stopper 48. In this manner, the stopper 48 restrains the pin 46 from coming off from the shaft housing part 13.

With the above-described configuration in which most of the operation lever 9 is housed within the gear housing 11, the grinder 1 of this embodiment can be reduced in height in the up-down direction and improved in design.

Further, the lower cover 7 protects parts disposed within the gear housing 11 (the shaft housing part 13) against impact from the outside and dust.

Further, the grinder 1 of this embodiment is advantageous in that the shaft lock mechanism 4 can be easily assembled. First, an assembler places the output shaft 41 and the spacer 45 in the shaft housing part 13. Then the assembler inserts the pin 46 into the right opening 452 of the spacer 45 through the through hole 138 from the right opening 138*r* of the shaft housing part 13, and places the flange 464 of the pin 46 within the spacer 45. Further, the assembler places the stopper 48 within the shaft housing part 13 from the opening 14 of the shaft housing part 13 such that the stopper 48 is placed on the right side of the spacer 45. The body part 465 of the pin 46 can be easily placed in the hole 482 of the stopper 48 since the hole 482 of the stopper 48 is open at the upper end of the first plate part 481. In the similar manner, the assembler places parts of the operation lever 9 in the shaft housing part 13 from the opening 14, and thereafter fixes the lower cover 7 to the lower surface 131 of the shaft housing part 13 by screws. In this manner, the second plate part 485 of the stopper 48 and a part of the operation lever 9 under the rotary shaft 94 are covered by the lower cover 7, and the stopper 48 and the operation lever 9 are held within the shaft housing part 13 by the lower cover 7. As described above, with the configuration in which the shaft housing part 13 has the opening 14 and the opening 14 is covered by the lower cover 7, the grinder 1 of this embodiment is advantageous in that the shaft lock mechanism 4 and the operation lever 9 can be easily assembled.

Second Embodiment

Figure 16:
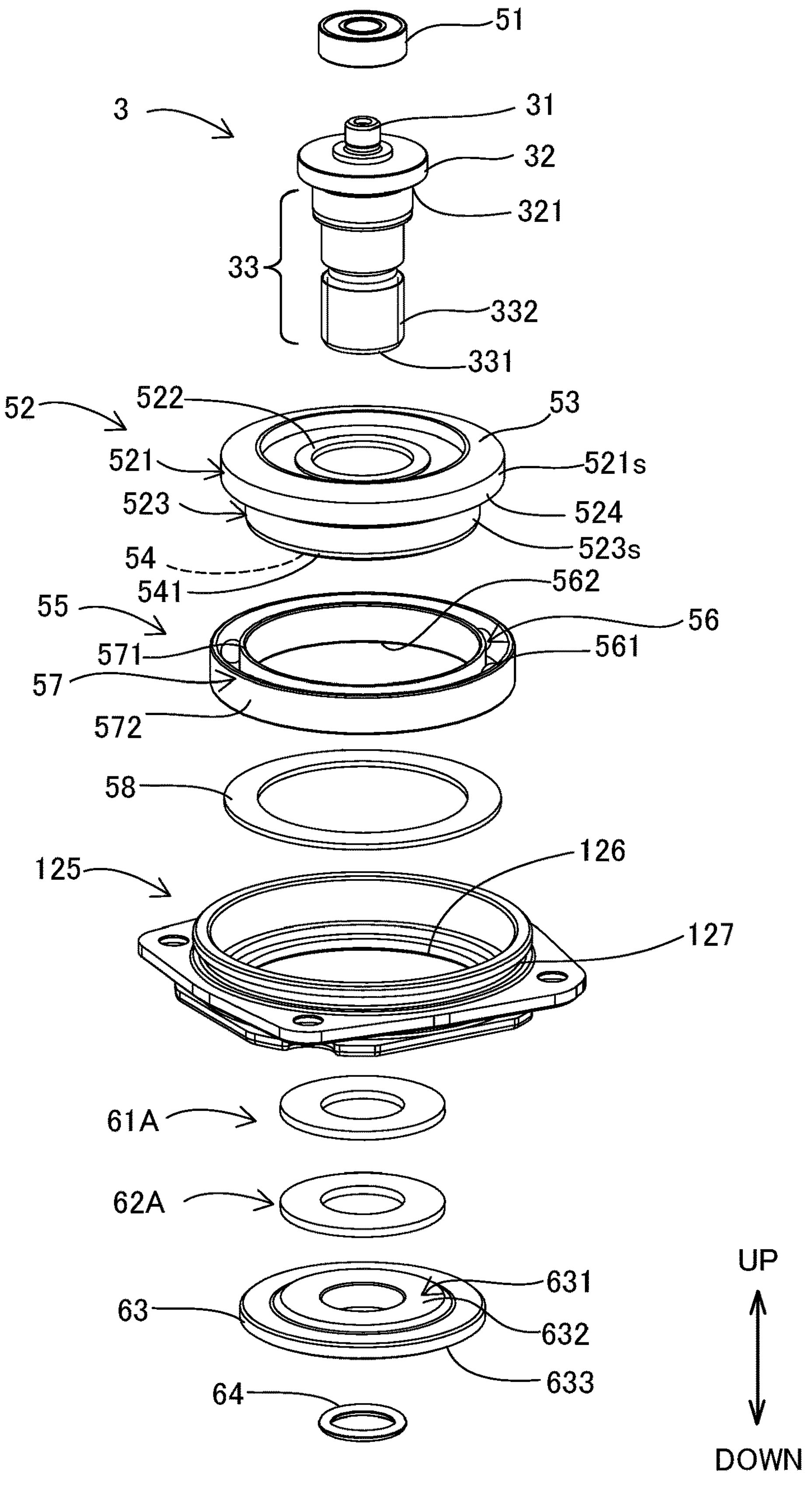
FIG. 16 is an exploded perspective view showing a spindle and parts fitted thereon in a grinder of a second embodiment.

FIG. 16 shows parts disposed around the spindle 3 in the grinder of a second embodiment. The second embodiment is different from the first embodiment in that an elastic element is used in place of the washers 61, 62 of the first embodiment as an element (anti-loosening part) for suppressing loosening of the lock nut 65. In this embodiment, disc springs 61A, 62A are used as the elastic element. Although not shown, like in the first embodiment, the whole of the disc springs 61A, 62A are housed in the gear recess 54. The other structures of the second embodiment are identical to those of the first embodiment and are therefore not described and shown.

When the lock nut 65 is fastened to the male thread part 332, the disc springs 61A, 62A are pressed and deformed, and subjected to a force (spring reaction force) for restoring from the press-deformed shape. In this embodiment, this spring reaction force suppresses loosening of the lock nut 65. Therefore, this embodiment also provides the same effect as the first embodiment. Elastic elements other than the disc springs 61A, 62A may be appropriately used as the anti-loosening part.

Third Embodiment

Figure 17:
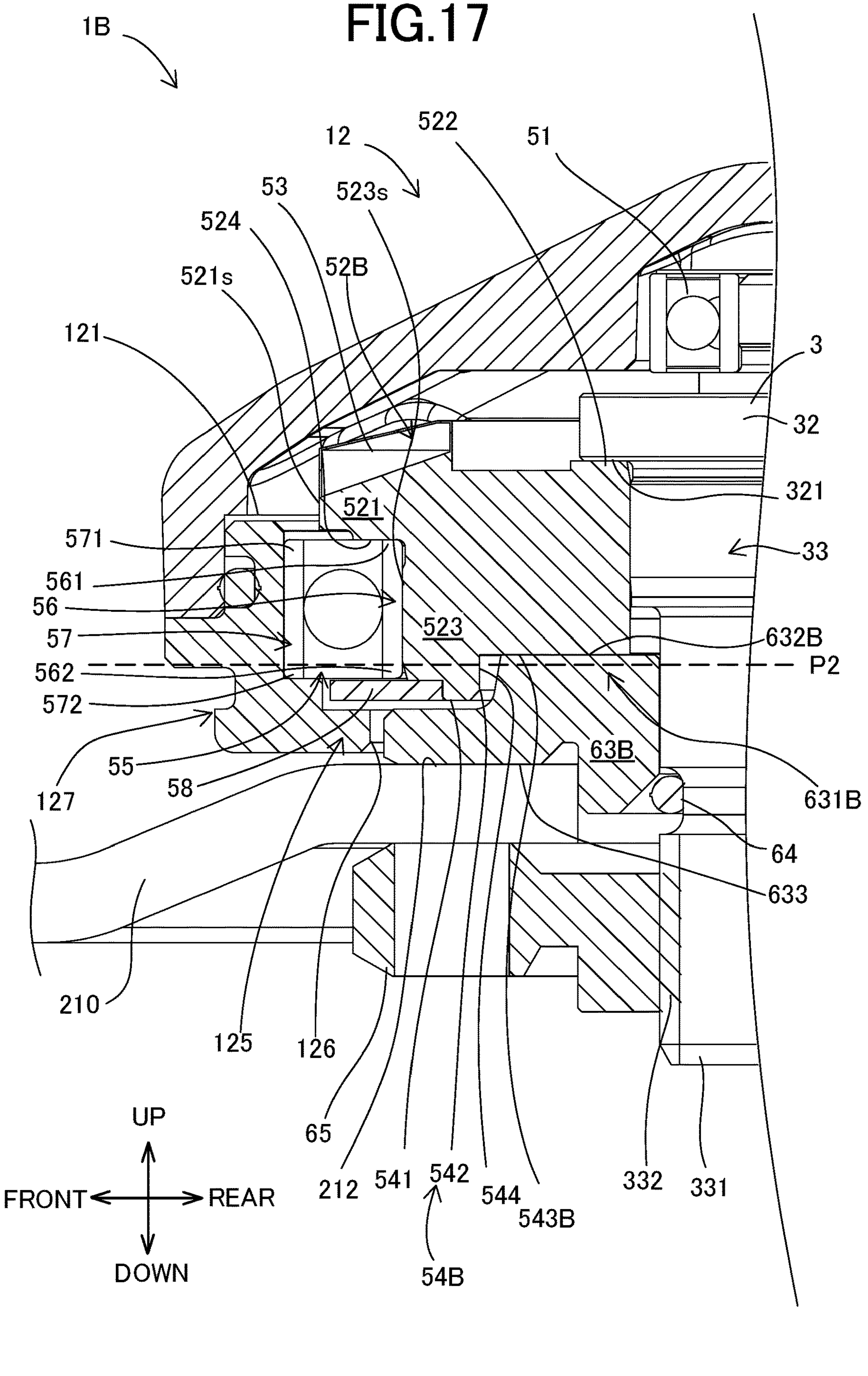
FIG. 17 is a partial, sectional view showing a grinder of a third embodiment and corresponding to FIG. 4 for the first embodiment.
Figure 18:
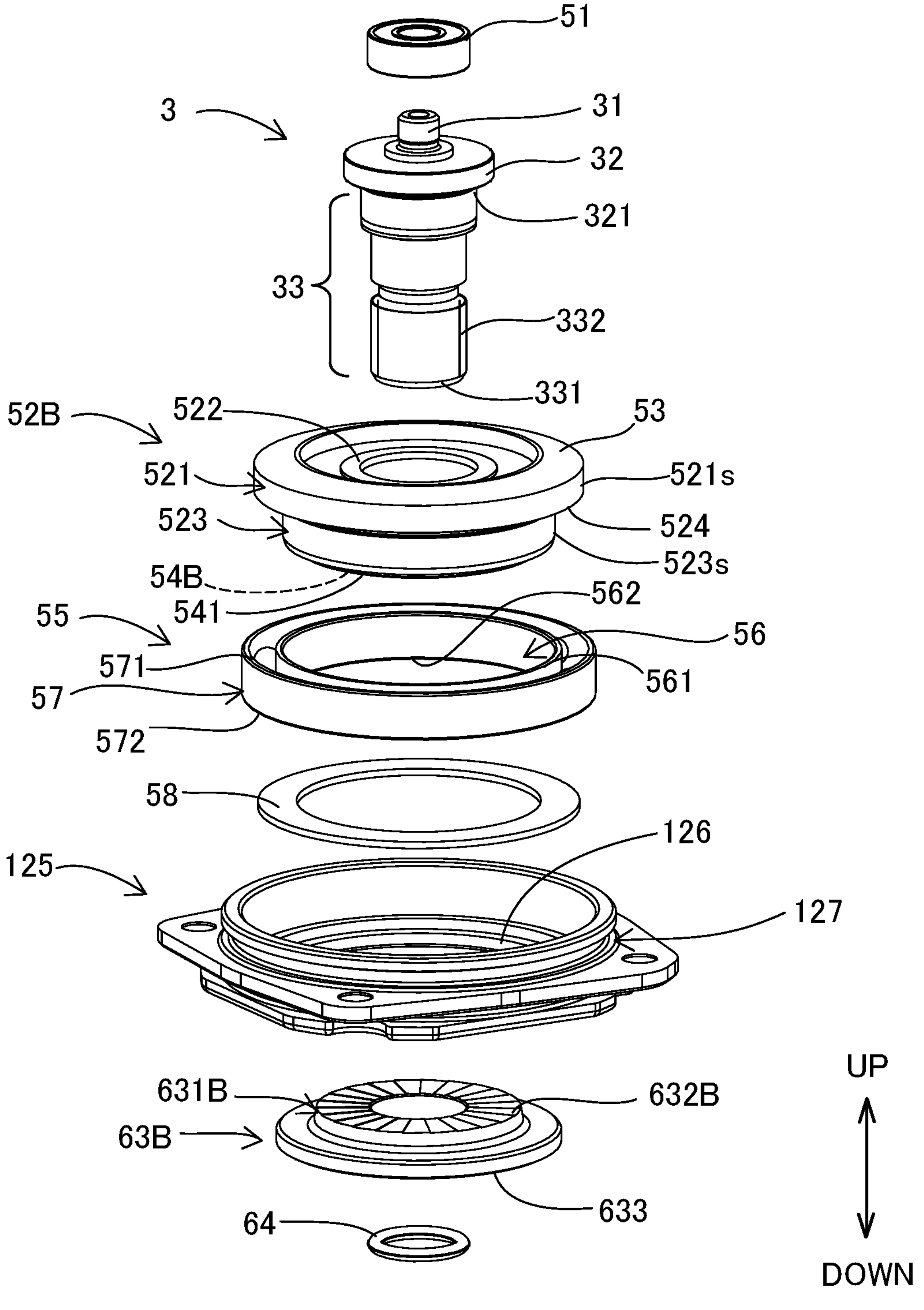
FIG. 18 is an exploded perspective view showing a spindle and parts fitted thereon in the grinder of the third embodiment.
Figure 19:
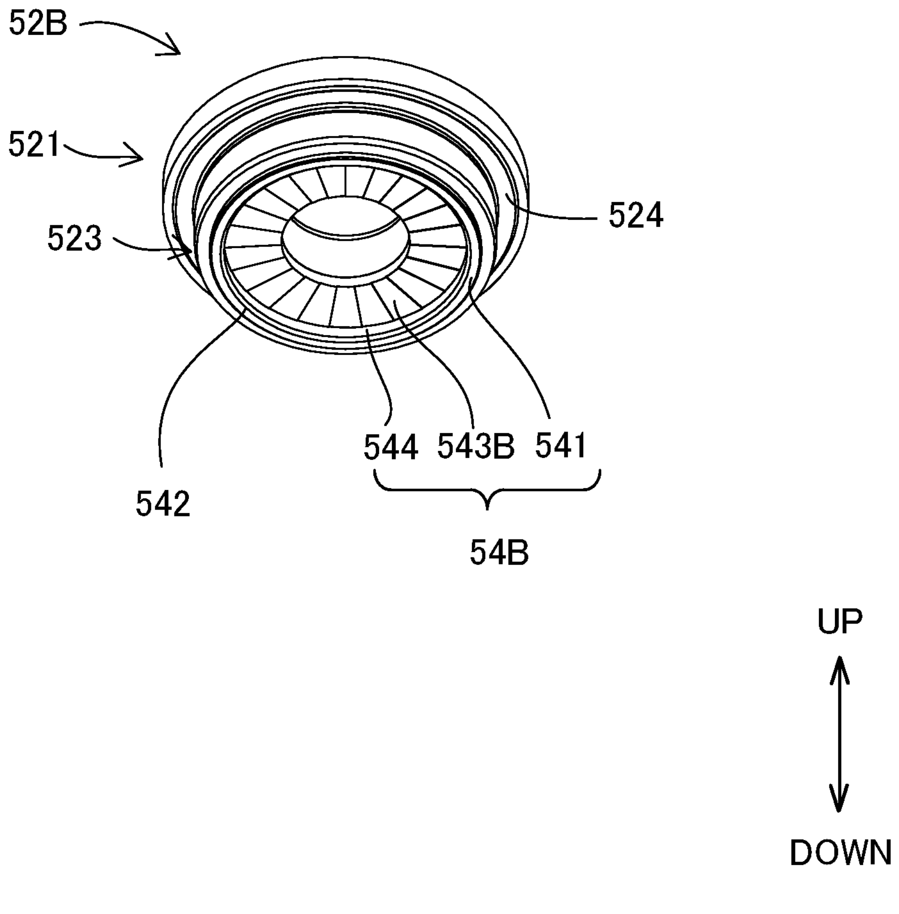
FIG. 19 is a bottom view of a gear of the third embodiment.

A grinder 1B of a third embodiment is now described with reference to FIGS. 17 to 19. The grinder 1B does not have the washers 61, 62. In this embodiment, most of a protrusion 631B of an inner flange 63B is housed in a gear recess 54B of a gear 52B. A bottom surface 543B of the gear recess 54B and an upper surface 632B of the protrusion 631B are formed as a cam face and abut each other. The cam angle of the bottom surface 543B of the gear recess 54B and the cam angle of the upper surface 632B of the inner flange 63B are larger than the angle of the thread of the male thread part 332. The other structures of the grinder 1B are identical to those of the first embodiment and are therefore not described and shown.

In the third embodiment, even if rotation of the tool accessory 210 is suddenly stopped by the braking mechanism, axial force is applied along the drive axis AX1 by the bottom surface 543B of the gear recess 54B and the upper surface 632B of the inner flange 63B. Therefore, the bottom surface 543B of the gear recess 54B and the upper surface 632B of the inner flange 63B provide a self-lock effect, so that loosening of the lock nut 65 is effectively suppressed. Thus, the number of parts to be provided on the spindle 3 can be reduced and the whole length of the spindle 3 can be further shortened, so that the gear housing 11 can be further reduced in height in the up-down direction.

Fourth Embodiment

Figure 20:
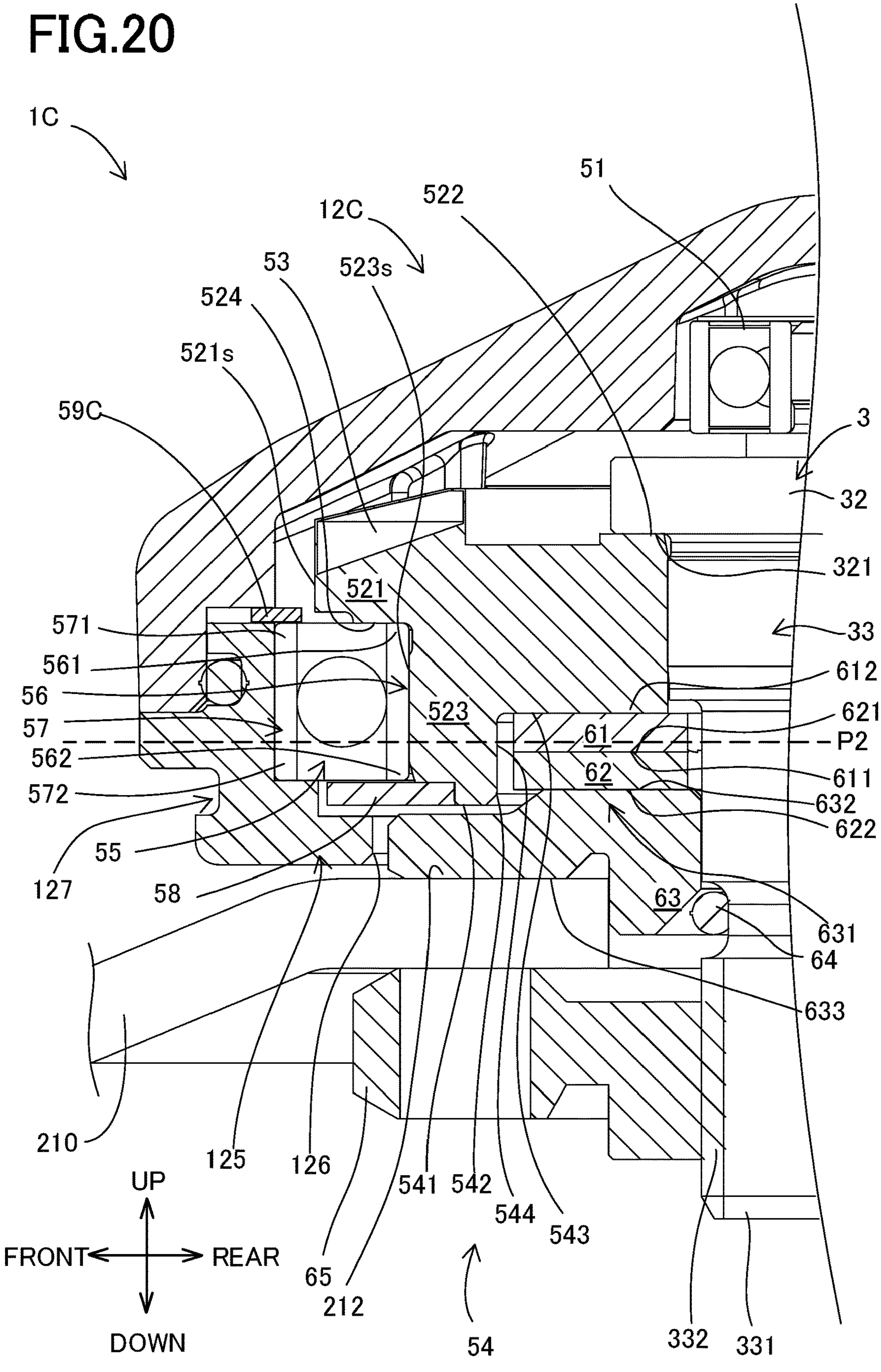
FIG. 20 is a partial, sectional view showing a grinder of a fourth embodiment and corresponding to FIG. 4 for the first embodiment.

A grinder 1C of a fourth embodiment is now described with reference to FIG. 20. In the grinder 1C, a spindle housing part 12C does not have the ribs 121, but has a retainer ring 59C that abuts the upper end 571 of the outer ring 57 of the lower bearing 55. The other structures of the grinder 1C are identical to those of the first embodiment and are therefore not described and shown.

The grinder 1C of the fourth embodiment also provides the same effect as the first embodiment.

Fifth Embodiment

Figure 21:
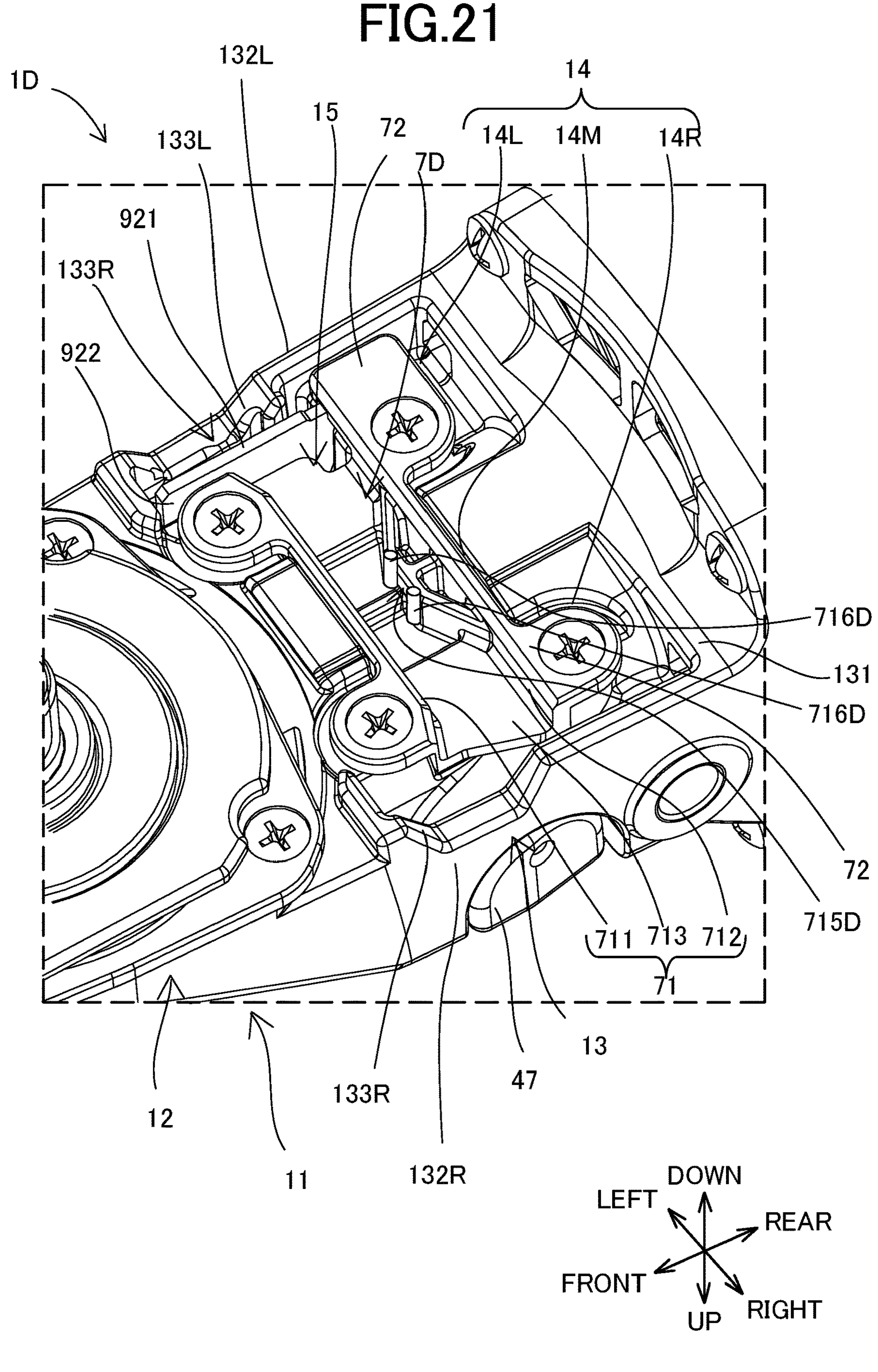
FIG. 21 is an enlarged view showing a recess of a shaft housing part and its vicinity, in a bottom view of a grinder of a fifth embodiment.

A grinder 1D of a fifth embodiment is now described with reference to FIG. 21. In the grinder 1D, rubber pins 716D are provided on a protrusion 715D formed in the groove 71 of a lower cover 7D. The rubber pins 716D are cylindrical rubber members. The rubber pins 716D are configured to abut the outer surface 812*s* of the protruding part 812 of the lock plate 81 arranged in the groove 71. The rubber pins 716D apply a forward biasing force, or a biasing force toward the outer surface 812*s* of the protruding part 812 of the lock plate 81, to the lock plate 81. Further, the rubber pins 716D abut the outer surface 812*s* of the lock plate 81 and elastically holds the lock plate 81. The other structures of the grinder 1D are identical to those of the first embodiment and are therefore not described and shown.

In the grinder 1D of the fifth embodiment, even if rattling (accidental loosening, gap) exists between the groove 71 of the lower cover 7D and the protruding part 812 of the lock plate 81, the cover part 8 is further restrained from moving during operation using the grinder 1D.

In the fifth embodiment, the protrusion 715D of the grinder 1D may be provided with an elastic element such as an elastic sheet in place of the rubber pins 716D.

Correspondences between the features of the above-described embodiments and the features of the present disclosure are as follows. However, the features of the above-described embodiments are merely exemplary and do not limit the features of the present disclosure or invention.

The washers 61, 62, the disc springs 61A, 62A, the bottom surface 543B of the gear recess 54B, the upper surface 632B of the inner flange 63B are examples of the "anti-loosening part".

The second outer diameter part 32 is an example of the "spindle flange".

Other Embodiments

The above-described embodiments are merely exemplary, and the power tool according to the present disclosure is not limited to the grinders 1, 1B, 1C, 1D of the above-described embodiments. For example, the following non-limiting modifications may be made. At least one of these modifications can be adopted in combination with at least one of the features of the grinders 1, 1B, 1C, 1D and the claimed invention.

The grinder 1, 1B, 1C, 1D may be provided with a known mechanical brake in place of the electrical brake of the above-described embodiments as the braking mechanism, or it may be omitted.

A tool accessory having an integral flange may be mounted to the grinder 1, 1B, 1C, 1D. At least part of the flange of the tool accessory may be housed in the gear recess 54. An example of such a tool accessory includes a grinding disc with a hub. In this case, the inner flange 63 can be omitted. With this configuration, the whole length of the spindle 3 can also be shortened, so that the gear housing 11 can be reduced in height in the up-down direction.

Not the whole but at least part of the washers 61, 62 or the disc springs 61A, 62A may be arranged within the gear recess 54. With this configuration, the whole length of the spindle 3 can also be shortened, so that the gear housing 11 can be reduced in height in the up-down direction.

The lower bearing 55 may have the same outer diameter as the gear 52. In this case, a retainer may be arranged in the gear housing 11 so as to abut the upper end 571 of the outer ring 57 of the lower bearing 55. With this configuration, the whole length of the spindle 3 can be shortened, so that the gear housing 11 can be reduced in height in the up-down direction.

In the above-described embodiments, the output shaft 41 and the motor shaft 21 are formed as separate parts, but, for example, the motor shaft 21 may be extended up to the shaft housing part 13 and the small bevel gear 411 may be provided on a front end part of the motor shaft 21, such that the motor shaft 21 can be used as an output shaft.

In place of the lock nut 65, any other fastening member may be used that can be threadedly engaged with the lower end part 331 of the spindle 3 to mount the tool accessory 210 to the lower end part 331.

The motor 2 may be a brush motor. The grinder 1 may be driven by power supplied from an external AC power source via a power cord.

In the above-described embodiments, from the viewpoint of shortening the whole length of the spindle 3, insofar as the lower bearing 55 is provided on the radially outer side of the gear 52, 52B, the other structures can be changed. For example, the gear 52, 52B need not have the gear recess 54, 54B. With this configuration, the whole length of the spindle 3 can also be shortened by the thickness of the lower bearing 55, so that the gear housing 11 can be reduced in height in the up-down direction. Further, the structures and arrangement of the operation lever 9 and the cover part 8 are not limited to those of the above-described embodiments or configurations, but can be appropriately changed.

Further, in view of the nature of the present disclosure and the above-described embodiments, the following aspects can be provided. At least one of the following aspects can be adopted in combination with at least one of the features of the above-described embodiments, its modifications and the claimed invention.

(Aspect A1)

The bearing comprises a lower bearing out of upper and lower bearings that rotatably support the spindle.

(Aspect A2)

The spindle has a first outer diameter part that forms an upper end part of the spindle, second outer diameter part that forms the spindle flange, and a third outer diameter part formed on a lower side of the spindle flange, and the gear is positioned on the spindle by abutting a lower surface of the second outer diameter part.

The following aspects B1 to B12 are provided, not only in a grinder but in the field of rotary tool, as one non-limiting object to provide a technique that helps reduce the height of a gear housing. Aspects B1 to B12 can be adopted separately or in combination of two or more of them. Alternatively, at least one of aspects B1 to B12 can be adopted in combination with at least one of the features of the grinders 1, 1B, 1C, 1D of the above-described embodiments, the modifications, the aspects described in this specification and the claimed invention.

(Aspect B1)

A rotary tool that performs an operation on a workpiece by rotationally driving a tool accessory, comprising:

a motor;

a spindle that is configured to be rotated around a drive axis that defines an up-down direction of the rotary tool, the spindle having a lower end part that is configured such that the tool accessory is removably mounted thereto by a fastening member being threadedly engaged with the lower end part;

a gear that is fitted on the spindle and configured to transmit rotation of the motor to the spindle;

an anti-loosening part that is fitted on the spindle and configured to suppress loosening of the fastening member; and a gear housing that houses the spindle, the gear and the anti-loosening part with the lower end part of the spindle protruded downward, wherein:

the gear has an opening in a lower surface of the gear and has a first recess recessed upward from the opening, and at least part of the anti-loosening part is housed in the first recess.

According to aspect B1, at least part of the anti-loosening part is housed in the first recess of the gear, so that the whole length of the spindle can be shortened. Thus, the gear housing can be reduced in height in the up-down direction, while loosening of the fastening member is suppressed. In other words, the height of the gear housing in the direction of the drive axis can be reduced. Therefore, the rotary tool is provided that can be used even in a limited space.

The "rotary tool" in aspect B1 includes a grinder, a cutter and a circular saw.

(Aspect B2) The rotary tool as defined in aspect B1, wherein the whole anti-loosening part is housed in the first recess.

According to aspect B2, the whole anti-loosening part is housed in the first recess of the gear, so that the whole length of the spindle can be further shortened. Thus, the gear housing can be further reduced in height in the up-down direction, while loosening of the fastening member is suppressed.

(Aspect B3) The rotary tool as defined in aspect B1 or B2, wherein the anti-loosening part includes a pair of cam faces facing each other in the up-down direction.

According to aspect B3, loosening of the fastening member can be physically suppressed by utilizing axial force applied in the up-down direction by the cam faces.

(Aspect B4) The rotary tool as defined in aspect B3, wherein:

the anti-loosening part includes a pair of washers, the cam faces comprise facing surfaces of the washers, respectively, and each of the washers further has a rib face provided on a side opposite to the cam face in the up-down direction.

According to aspect B4, loosening of the fastening member can be physically suppressed by utilizing axial force applied in the up-down direction.

(Aspect B5) The rotary tool as defined in aspect B1 or B2, wherein the anti-loosening part comprises an elastic element.

According to this aspect, loosening of the fastening member can be suppressed by the elastic element.

(Aspect B6) The rotary tool as defined in aspect B5, wherein the anti-loosening part comprises a disc spring.

According to this aspect, loosening of the fastening member can be suppressed by utilizing reaction force of the spring.

(Aspect B7) The rotary tool as defined in any one of aspects B1 to B6, further comprising:

a flange that is arranged between the anti-loosening part and the tool accessory in the up-down direction, or integrally formed with the tool accessory arranged under the anti-loosening part, wherein:

at least part of the flange is housed in the first recess.

According to this aspect, at least part of the flange is housed in the first recess of the gear, so that the whole length of the spindle can be shortened. Thus, the whole length of the spindle can be further shortened, while loosening of the fastening member is suppressed. Accordingly, the gear housing can be reduced in height in the up-down direction.

(Aspect B8) The rotary tool as defined in aspect B7 dependent on aspect B3, wherein:

the first recess has a bottom surface that is located above the lower surface of the gear in the up-down direction, an upper surface of the flange abuts the bottom surface of the first recess, and the pair of the cam faces comprise the upper surface of the flange and the bottom surface of the first recess, respectively.

According to this aspect, the cam faces on the bottom surface of the first recess and the upper surface of the flange can be utilized as the anti-loosening part. Therefore, the number of parts to be provided on the spindle can be reduced and the whole length of the spindle can be further shortened, so that the gear housing can be further reduced in height in the up-down direction, while loosening of the fastening member is suppressed.

(Aspect B9) The rotary tool as defined in any one of aspect B1 to B8, further comprising a bearing that is arranged on the radially outer side of the gear and rotatably supports the spindle.

(Aspect B10) The rotary tool as defined in any one of aspect B1 to B9, wherein the bearing comprises a lower bearing out of upper and lower bearings that rotatably support the spindle.

(Aspect B11) The rotary tool as defined in any one of aspect B1 to B10, further comprising a braking mechanism that is configured to stop rotation of the motor.

(Aspect B12) The rotary tool as defined in any one of aspect B1 to B11, further comprising an output shaft that is configured to be rotated around an output axis by the motor and extends in a direction substantially orthogonal to the drive axis.

As for aspects B1 to B12, correspondences between the features of the above-described embodiments and the features of the present disclosure are as follows. However, the features of the above-described embodiments are merely exemplary and do not limit the features of the present disclosure or invention.

The gear recess 54, 54B is an example of the "first recess". The washers 61, 62, the disc springs 61A, 62A, the bottom surface 543B of the gear recess 54B, the upper surface 632B of the inner flange 63B are examples of the "anti-loosening part".

The cam faces 611, 621, the bottom surface 543B, the upper surface 632B are examples of the "cam face".

Further, as for aspects B1 to B12, from the viewpoint of suppressing loosening of the lock nut 65 while shortening the whole length of the spindle 3, insofar as the gear 52 has the gear recess 54, 54B and at least part of the anti-loosening part (the washers 61, 62, the disc springs 61A, 62A, the bottom surface 543B and the upper surface 632B) is arranged in the gear recess 54, 54B, the other structures can be changed. For example, the lower bearing 55 need not be arranged on the radially outer side of the gear 52, 52B, and may be directly fitted onto the spindle 3. Further, the structures and arrangement of the operation lever 9 and the cover part 8 are not limited to those of the above-described embodiments or configurations, but can be appropriately changed.

The following aspects C1 to C10 are provided, not only in a grinder but in the field of power tool, as one non-limiting object to provide a technique that helps reduce the height of a power tool in the up-down direction. Aspects C1 to C10 can be adopted separately or in combination of two or more of them. Alternatively, at least one of aspects C1 to C10 can be adopted in combination with at least one of the features of the grinders 1, 1B, 1C, 1D of the above-described embodiments, the modifications, the aspects described in this specification and the claimed invention.

(Aspect C1) A power tool, comprising:

a motor;

an output shaft that is configured to be rotated around an output axis by the motor;

a spindle that is configured to be rotated around a drive axis defining an up-down direction of the power tool, by rotation of the output shaft, the spindle having a lower end part that is configured such that a tool accessory is removably mounted thereto;

a gear housing that houses at least part of the output shaft and the spindle with the lower end part of the spindle protruded downward;

a cover body that is configured to at least partially cover the tool accessory mounted to the lower end part, under the gear housing;

a first engagement part that is fixed to the cover body; and a second engagement part at least part of which is housed in the gear housing, which can be moved within the gear housing between an engagement position to be engaged with the first engagement part to restrict movement of the cover body around the drive axis and a disengagement position to be disengaged from the first engagement part.

According to aspect C1, at least part of the second engagement part that is engaged with the first engagement part and restricts rotation of the cover body is housed in the gear housing. Therefore, compared with a structure in which at least part of the second engagement part is not arranged in the gear housing, the cover body can be arranged closer to the gear housing. Thus, the height of the power tool in the up-down direction can be reduced, and the power tool can be reduced in height in the up-down direction.

The "power tool" of aspect C1 includes a rotary tool that rotates the tool accessory around the drive axis and is configured such that the cover body configured to at least partially cover the tool accessory can be mounted thereto, and an oscillating tool that oscillates (reciprocally rotates) the tool accessory around the drive axis. The rotary tool includes a grinder, a cutter and a circular saw. The oscillating tool includes a multi-tool.

(Aspect C2) The power tool as defined in aspect C1, wherein a lower end of the second engagement part is located in the same position as or above a lower end of the gear housing in the up-down direction.

According to aspect C2, a distance between the cover body and the gear housing in the up-down direction can be further shortened, so that the power tool can be further reduced in height in the up-down direction.

(Aspect C3) The power tool as defined in aspect C1 or C2, wherein:

the output shaft extends in a direction crossing the drive axis, and the second engagement part is arranged on a first side or a second side opposite to the first side of an imaginary plane including the output axis and the drive axis.

According to aspect C3, compared with a structure in which the second engagement part is arranged on the upper or lower side of the output shaft, the gear housing can be reduced in height in the up-down direction.

(Aspect C4) The power tool as defined in any one of aspects C1 to C3, wherein:

the second engagement part is configured to be rotated around a rotational axis between the engagement position and the disengagement position, and the rotational axis is arranged within the gear housing.

According to aspect C4, the second engagement part is rotated around the rotational axis arranged within the gear housing, so that the gear housing can be reduced in height in the up-down direction.

(Aspect C5) The power tool as defined in aspect C3 or aspect C4 dependent on aspect C3, wherein the second engagement part is arranged in parallel to the imaginary plane.

According to aspect C5, the second engagement part is arranged in parallel to the output shaft, so that the internal space of the gear housing can be effectively utilized, and increase in the thickness of the gear housing in a direction crossing the imaginary plane can be restrained.

(Aspect C6) The power tool as defined in aspect C5, wherein the second engagement part comprises a plate-like member.

According to aspect C6, increase in the thickness of the gear housing in a direction crossing the imaginary plane can be further restrained while at least part of the second engagement part is arranged in the gear housing.

(Aspect C7) The power tool as defined in any one of aspects C1 to C6, wherein:

the first engagement part includes a protruding part protruding upward from an upper surface of the cover body, and the protruding part has a groove open upward.

According to aspect C7, the cover body is restricted from rotating by engagement of the second engagement part with the groove of the first engagement part.

(Aspect C8) The power tool as defined in any one of aspects C1 to C7, wherein:

the second engagement part includes an operation part for moving the second engagement part between the engagement position and the disengagement position by user's operation, and the operation part is provided on the upper side of the gear housing.

According to aspect C8, the distance between the cover body and the gear housing in the up-down direction can be shortened while the operation part is provided on the upper side of the gear housing. Thus, the power tool can be reduced in height in the up-down direction.

(Aspect C9) The power tool as defined in any one of aspects C1 to C8, wherein:

the gear housing has a recess recessed upward from a lower surface of the gear housing in the up-down direction, and at least part of the first engagement part is configured to be arranged in the recess.

(Aspect C10) The power tool as defined in any one of aspects C1 to C9, wherein:

at least part of the second engagement part is:

in the engagement position, placed in the recess and engaged with the first engagement part, and in the disengagement position, placed within the shaft housing part above the recess.

As for aspects C1 to C10, correspondences between the features of the above-described embodiments and the features of the present disclosure are as follows. However, the features of the above-described embodiments are merely exemplary and do not limit the features of the present disclosure or invention.

The lock plate 81, the protruding part 812 and the groove 814 are examples of the "first engagement part".

The operation lever 9, the body part 92 and the engagement part 922 are examples of the "second engagement part".

The plane P1 is an example of the "imaginary plane". The right side and the left side are examples of the "first side" and the "second side", respectively.

Further, as for aspects C1 to C10, insofar as at least part of the operation lever 9 of the above-described embodiments is housed in the shaft housing part 13, the other structures can be changed. For example, although, in the above-described embodiments, the operation lever 9 is configured to be moved to the disengagement position by user's operation of pushing the operation lever 9, the operation lever 9 may be configured to be moved to the disengagement position by user's operation of pulling the operation lever 9. The operation lever 9 may be configured to move between the engagement position and the disengagement position by moving in the up-down direction instead of rotating around the rotational axis AX4. Further, for example, the operation lever 9 may protrude not from the upper surface 134 but from the side surface 132L, 132R of the gear housing 11. With this configuration, the cover part 8 and the gear housing 11 can also be arranged closer to each other in the up-down direction. Similarly, the structure and arrangement of the cover part 8 are not limited to those of the above-described embodiments or configurations, but can be appropriately changed according to the structure and arrangement of the operation lever 9.

The following aspects D1 to D14 are provided, not only in a grinder but in the field of rotary tool, as one non-limiting object to provide a technique that helps reduce the height of a power tool in the up-down direction. Aspects D1 to D14 can be adopted separately or in combination of two or more of them. Alternatively, at least one of aspects D1 to D14 can be adopted in combination with at least one of the features of the grinders 1, 1B, 1C, 1D of the above-described embodiments, the above-described modifications, the aspects described in this specification and the claimed invention.

(Aspect D1) A power tool, comprising:

a motor;

an output shaft that is configured to be rotated by the motor around an output axis defining a front-rear direction of the power tool;

a housing including a shaft housing part that extends in the front-rear direction and houses at least part of the output shaft; and a first bearing and a second bearing that are arranged apart from each other in the front-rear direction and hold the output shaft in the housing so as to be rotatable around the output axis, wherein:

the shaft housing part has a second recess that is formed between the first and second bearings in the front-rear direction and recessed upward from a lower surface of the shaft housing part in an up-down direction orthogonal to the front-rear direction.

According to aspect D1, by provision of the second recess between the first and second bearings in the shaft housing part, a space between the first and second bearings can be effectively utilized. For example, an element (part) of the power tool can be arranged within the second recess. Thus, the power tool can be reduced in height in the up-down direction.

(Aspect D2) The power tool as defined in aspect D1, wherein the second recess extends across the shaft housing part in a direction crossing the front-rear direction and the up-down direction.

According to aspect D2, out of elements (parts) of the power tool, at least part of an element extending across the shaft housing part can be arranged within the second recess.

(Aspect D3) The power tool as defined in aspect D1 or D2, comprising:

a spindle that is operably connected to the output shaft to rotate around a drive axis extending in the up-down direction, the spindle having a lower end part that protrudes from the housing and is configured such that a tool accessory is removably mounted thereto;

a cover body that is configured to at least partially cover the tool accessory mounted to the lower end part:

a first engagement part that is fixed to the cover body; and a second engagement part that is disposed in the housing and can be moved between an engagement position to be engaged with the first engagement part to restrict movement of the cover body around the drive axis and a disengagement position to be disengaged from the first engagement part, wherein:

at least part of the first engagement part is arranged in the second recess.

According to aspect D3, at least part of the first engagement part is arranged in the second recess, so that the power tool can be formed compact Such a "power tool" includes a cutting tool and a grinding tool that perform cutting operation and grinding operation, respectively, on a workpiece by rotationally driving the tool accessory. Such a rotary tool includes a grinder, a cutter and a multi-tool.

(Aspect D4) The power tool as defined in any one of aspects D1 to D3, wherein:

an opening is formed in the lower surface of the shaft housing part, the power tool further comprises a lower cover that closes at least part of the opening, and at least part of the second recess is defined by the lower cover.

According to aspect D4, a part of the power tool can be arranged in the second recess, and parts within the housing can be protected by the lower cover.

(Aspect D5) The power tool as defined in aspect D4, further comprising:

a pin that is configured to be engaged with the output shaft and restrict rotation of the output shaft;

an operation part that is connected to the pin and arranged outside of the housing, and configured to be manually operated by a user; and a stopper that is held in the housing by the lower cover and restrains the pin from coming off from the housing.

According to aspect D5, the stopper can be held by the lower cover while rotation of the output shaft is restricted.

(Aspect D6) The power tool as defined in aspect D4 dependent on aspect D3, or aspect D5 indirectly dependent on aspect D3, wherein the second engagement part is held by the lower cover and the shaft housing part so as to be movable between the engagement position and the disengagement position.

According to aspect D6, the second engagement part can be held while parts in the housing are protected by the lower cover.

(Aspect D7) The power tool as defined in any one of aspects D4 to D6 directly or indirectly dependent on aspect D3, wherein the lower cover has a movement restricting part that abuts the first engagement part and restricts movement of the first engagement part relative to the lower cover.

According to aspect D7, the cover body is restrained from moving during operation using the power tool, even if rattling (accidental loosening, gap) exists between the first engagement part and the lower cover.

(Aspect D8) The power tool as defined in aspect D7, wherein the movement restricting part has an elastic member that elastically holds the first engagement part while applying a biasing force to the first engagement part.

According to aspect D8, the cover body is effectively restrained from moving during operation using the power tool, even if rattling (accidental loosening, gap) exists between the first engagement part and the lower cover.

(Aspect D9) The power tool as defined in any one of aspects D4 to D8, wherein:

the lower cover has a groove having a bottom surface that is arranged above the lower surface of the shaft housing part, and the bottom surface of the groove is arranged above a lower end of the shaft housing part in the up-down direction.

(Aspect D10) The power tool as defined in aspect D9, wherein the bottom surface of the groove of the lower cover closes the spacer opening.

(Aspect D11) The power tool as defined in any one of aspects D1 to D10, wherein:

an opening is formed in the lower surface of the shaft housing part, the power tool further comprises a spacer that is arranged between the first and second bearings, and a spacer opening is formed in a lower part of the spacer along the opening formed in the lower surface of the shaft housing part.

(Aspect D12) The power tool as defined in aspect D4 dependent on aspect D3, comprising:

a pin that is configured to be engaged with the output shaft and restrict rotation of the output shaft;

an operation part that is connected to the pin and arranged outside of the housing, and configured to be manually operated by a user; and a stopper that is held in the housing by the lower cover and restrains the pin from coming off from the housing, wherein:

the second engagement part is arranged on a first side of an imaginary plane that is parallel to the drive axis and includes an axis of the output shaft, and the pin and the stopper are arranged on a second side opposite to the first side of the imaginary plane.

(Aspect D13) The power tool as defined in aspect D3, wherein:

the cover body includes an arcuate part that has a larger radius than the radius of the tool accessory, a plate-like part that extends radially inward from an upper end of the arcuate part, and a first mounting part that has a generally arcuate shape extending along a circumferential direction around the drive axis in the plate-like part, the housing includes a spindle housing part that houses the spindle with the lower end part of the spindle protruded downward from a through hole, a second mounting part is provided around the through hole of the spindle housing part and configured to receive and hold the first second mounting part in the up-down direction.

(Aspect D14) A power tool, comprising:

a motor;

an output shaft that is configured to be rotated by the motor around an output axis defining a front-rear direction of the power tool;

a housing including a shaft housing part that extends in the front-rear direction and houses at least part of the output shaft; and a first bearing and a second bearing that are arranged apart from each other in the front-rear direction and hold the output shaft in the housing so as to be rotatable around the output axis, wherein:

the shaft housing part has an opening part that is formed between the first and second bearings in the front-rear direction in a lower surface of the shaft housing part in an up-down direction orthogonal to the front-rear direction.

According to aspect D14, by provision of the opening part between the first and second bearings in the shaft housing part, a space between the first and second bearings can be effectively utilized.

As for aspects D1 to D14, correspondences between the features of the above-described embodiments and the features of the present disclosure are as follows. However, the features of the above-described embodiments are merely exemplary and do not limit the features of the present disclosure or invention.

The opening 14, the spacer opening 451, the groove 71 and the recess 15 are examples of the "second recess".

The lock plate 81, the protruding part 812 and the groove 814 are examples of the "first engagement part".

The operation lever 9, the body part 92 and the engagement part 922 are examples of the "second engagement part". At least one of the opening 14, the spacer opening 451, the groove 71 and the recess 15 is an example of the "opening part".

Further, as for aspects D1 to D14, from the viewpoint of thinning the grinder 1 (the power tool) in the up-down direction by arranging parts of the power tool within the recess 15, the recess 15 of the shaft housing part 13 need only be recessed upward from the lower surface 131. For example, the recess 15 may be formed by a wall (lower wall) defining the shaft housing part 13 being recessed upward. In this case, the recess 15 need not have the lower cover 7 and the opening 14. With this configuration, for example, the lock plate 81 can also be arranged within the recess 15, so that the power tool can be reduced in height in the up-down direction.

Further, the structures and arrangement of the operation lever 9 and the cover part 8 are not limited to those of the above-described embodiments or configurations, but can be appropriately changed. For example, the operation lever 9 may be configured to be arranged on the right or left side of the recess 15 on the outside of the shaft housing part 13 and engaged with the lock plate 81 extending out of the recess 15.

DESCRIPTION OF THE REFERENCE NUMERALS

1, 1B, 1C, 1D: grinder, 2: motor, 21: motor shaft, 3: spindle, 31: first outer diameter part, 32: second outer diameter part, 321: lower surface, 33: third outer diameter part, 331: lower end part, 332: male thread part, 4: shaft lock mechanism, 46: pin, 461: first end part, 462: second end part, 464: flange, 465: body part, 47: operation part, 48: stopper, 481: first plate part, 482: hole, 485: second plate part, 49: biasing spring, 41: output shaft, 411: small bevel gear, 412: insertion hole, 43: first bearing, 44: second bearing, 441: bearing retainer, 45: spacer, 451: spacer opening, 452: right opening, 453: first abutment part, 454: second abutment part, 51: upper bearing, 52, 52B: gear, 521: upper part, 521*s*: outer peripheral surface, 522: abutment part, 523: lower part, 523*s*: outer peripheral surface, 524: connection surface, 53: tooth part, 54, 54B: gear recess, 541: lower end part, 542: opening, 543, 543B: bottom surface, 544: side surface, 55: lower bearing, 56: inner ring, 561: upper end, 562: lower end, 57: outer ring, 571: upper end, 572: lower end, 58: sealing, 59C: retainer ring, 61, 62: washer, 611, 621: cam face, 612, 622; rib face, 61A, 62A: disc spring, 63, 63B: inner flange, 631, 631B: protrusion, 632, 632B: upper surface, 633: lower surface, 64: O-ring, 65: lock nut, 7, 7D: lower cover, 71: groove, 711: front surface, 712: rear surface, 713: bottom surface, 715, 715D: protrusion, 716D; rubber pin, 72: lower surface, 8: cover part, 80: cover body, 801: arcuate part, 802: plate-like part, 803: bent part, 804: first mounting part, 81: lock plate, 811: fixed part, 812: protruding part, 812*s*: outer surface, 813: upper end, 814: groove, 816: wall, 9: operation lever, 91: operation part, 92: body part, 921: lower end, 922: engagement part, 93: biasing member, 94: rotary shaft, 10: housing, 11: gear housing, 12, 12C: spindle housing part, 121: rib, 13: shaft housing part, 131: lower surface, 132L: left wall, 133L: through part, 132R: right wall, 133R: through part, 134: upper surface, 135: opening, 136: lower end, 137: screw hole, 138: through hole, 138*r*: right opening, 14: opening, 14L: left opening part, 14M: central opening part, 14R: right opening part, 15: recess, 17: motor housing, 18: handle housing, 181: battery mounting part, 101: switch, 102: controller, 125: bearing box, 126: through hole, 12: second mounting part, 210: tool accessory, 211: outer edge part, 212: upper surface, 220: battery, AX1: dive axis, AX2, AX3: rotational axis, AX4: rotational axis, L1, L2, L3: distance, P1, P2: plane

The invention claimed is:

1. A power tool, comprising:

a motor;

an output shaft that is configured to be rotated around an output axis by the motor;

a spindle that is configured to be rotated around a drive axis crossing an extending direction of the output axis and defining an up-down direction of the power tool, the spindle having a lower end part that is configured such that a tool accessory is removably mounted thereto;

a gear that is press-fitted on the spindle to transmit rotation of the output shaft to the spindle;

a gear housing that houses the spindle and the gear with the lower end part of the spindle protruded downward;

a bearing that is housed in the gear housing and arranged on a radially outer side of the gear and configured to support the spindle so as to be rotatable around the drive axis, a cover body that is configured to at least partially cover the tool accessory mounted to the lower end part, under the gear housing;

a first engagement part that is fixed to the cover body; and a second engagement part, at least part of which is housed in the gear housing, which is movable between an engagement position in which the second engagement part mechanically engages the first engagement part to restrict rotation of the cover body around the drive axis, and a disengagement position in which the second engagement part is to be disengaged from the first engagement part to allow the cover body to rotate around the drive axis.

2. The power tool as defined in claim 1, wherein a lower end of the second engagement part is located in the same position as or above a lower end of the gear housing in the up-down direction.

3. The power tool as defined in claim 1 wherein:

the second engagement part includes a rotational axis extending in a direction that is orthogonal to the output axis and the drive axis.

4. A power tool comprising:

a motor;

an output shaft that is configured to be rotated around an output axis by the motor;

a spindle that is configured to be rotated around a drive axis crossing an extending direction of the output axis and defining an up-down direction of the power tool, the spindle having a lower end part that is configured such that a tool accessory is removably mounted thereto;

a gear that is press-fitted on the spindle to transmit rotation of the output shaft to the spindle;

a gear housing that houses the spindle and the gear with the lower end part of the spindle protruded downward;

a bearing that is housed in the gear housing and arranged on a radially outer side of the gear and configured to support the spindle so as to be rotatable around the drive axis, a housing including the gear housing and a shaft housing part that extends in a front-rear direction in which the output shaft extends, and houses at least part of the output shaft; and a first bearing and a second bearing that are arranged apart from each other in the front-rear direction and hold the output shaft in the housing so as to be rotatable around the output axis, wherein:

the shaft housing part has a recess that is arranged between the first and second bearings in the front-rear direction and recessed upward from a lower surface of the shaft housing part in the up-down direction.

5. The power tool as defined in claim 4, wherein the recess extends across the shaft housing part in a direction crossing the front-rear direction and the up-down direction.

6. The power tool as defined in claim 4, comprising:

a cover body that is configured to at least partially cover the tool accessory mounted to the lower end part:

a first engagement part that is fixed to the cover body; and a second engagement part that is disposed in the housing and can be moved between an engagement position to be engaged with the first engagement part to restrict movement of the cover body around the drive axis and a disengagement position to be disengaged from the first engagement part, wherein:

at least part of the first engagement part is arranged in the recess.

7. A power tool, comprising:

a motor;

an output shaft that is configured to be rotated around an output axis by the motor;

a spindle that is configured to be rotated around a drive axis crossing an extending direction of the output shaft and defining an up-down direction of the power tool, the spindle having a lower end part that is configured such that a tool accessory is removably mounted thereto;

a gear that is fitted on the spindle and configured to transmit rotation of the output shaft to the spindle, the gear having an opening in a lower surface of the gear and has a first recess recessed upward from the opening;

a gear housing that houses the spindle and the gear with the lower end part of the spindle protruded downward;

a bearing that is housed in the gear housing and arranged on a radially outer side of the gear and configured to support the spindle so as to be rotatable around the drive axis, wherein the lower end part of the spindle is configured such that the tool accessory can be removably mounted thereto by a fastening member being threadedly engaged around the drive axis with the lower end part, the power tool comprises a rotary tool that performs an operation on a workpiece by rotationally driving the tool accessory, and the power tool further comprises an anti-loosening part at least part of which is housed in the first recess in the up-down direction, the anti-loosening part being configured to suppress loosening of the fastening member.

8. The power tool as defined in claim 7, wherein a whole of the anti-loosening part is housed in the first recess.

9. The power tool as defined in claim 7, wherein the anti-loosening part is arranged to overlap with the bearing in the up-down direction.

10. The power tool as defined in claim 7, wherein the anti-loosening part includes a pair of cam faces facing each other in the up-down direction.

11. The power tool as defined in claim 10, wherein:

the anti-loosening part includes a pair of washers, the cam faces comprise facing surfaces of the washers, respectively, and each of the washers further has a rib face provided on a side opposite to the cam face in the up-down direction.

12. The power tool as defined in claim 7, comprising:

a flange that is formed between the anti-loosening part and the tool accessory in the up-down direction, or integrally formed with the tool accessory arranged under the anti-loosening part, wherein at least part of the flange is housed in the first recess.

13. The power tool as defined in claim 1, wherein the gear and the bearing are adjacent in a radial direction and an inner circumferential surface of the bearing is in contact with an outer circumferential surface of the gear.

14. The power tool as defined in claim 7, wherein an outer diameter of the bearing is larger than an outer diameter of the gear.

15. The power tool as defined in claim 7, wherein the bearing directly holds the gear and holds the spindle via the gear such that the spindle can rotate around the drive axis.

16. The power tool as defined in claim 14, wherein the gear housing has a rib that holds an outer ring of the bearing.

17. The power tool as defined in claim 7, wherein the first recess includes a side surface that is spaced apart from an outer diameter surface of the spindle in a radial direction.

18. The power tool as defined in claim 7, wherein:

the spindle has a spindle flange having an outer diameter larger than an inner diameter of the gear, and the spindle flange is arranged on an upper side of the gear.

* * * * *